United States Patent [19]

Nakaho

[11] Patent Number: 5,272,335
[45] Date of Patent: Dec. 21, 1993

[54] ECCENTRICITY-COMPENSATED POSITION DETECTING APPARATUS HAVING AN IDENTIFYING TRANSPARENT SLIT

[75] Inventor: Junichi Nakaho, Aichi, Japan

[73] Assignee: Kabushiki Kaisha Tokai Rika Denki Seisakusho, Aichi, Japan

[21] Appl. No.: 942,267

[22] Filed: Sep. 9, 1992

[30] Foreign Application Priority Data

Sep. 9, 1991 [JP] Japan .................................. 3-256977
May 29, 1992 [JP] Japan .................................. 4-138597
Jun. 30, 1992 [JP] Japan .................................. 4-172660

[51] Int. Cl.[5] .............................................. G01D 5/34
[52] U.S. Cl. ........................ 250/231.13; 250/214 PR; 324/160
[58] Field of Search ............... 250/231.13, 231.14, 250/231.15, 231.16, 231.17, 231.18, 237 G, 214 PR; 341/13; 358/133, 135, 141; 324/160, 166

[56] References Cited

U.S. PATENT DOCUMENTS

| | | | |
|---|---|---|---|
| 2,989,642 | 6/1961 | Svec | 250/231.13 |
| 4,902,885 | 2/1990 | Kojima et al. | 250/231.13 |
| 4,928,009 | 5/1990 | Ikebe et al. | 280/231.14 |
| 4,977,316 | 12/1990 | Malcolm et al. | 250/231.13 |
| 5,012,188 | 4/1991 | Kubo et al. | 324/166 |

FOREIGN PATENT DOCUMENTS

2328244 5/1977 France .
2653552 4/1991 France .

OTHER PUBLICATIONS

Patent Abstracts of Japan: vol. 10, No. 300, p. 506, Oct. 14, 1986, Japan Publication No. JP 61 117 414, dated Jun. 4, 1986.
Patent Abstracts of Japan; vol. 10, No. 93, p. 445, Apr. 10, 1986, Japan Publication No. JP 60 227 112, dated Nov. 12, 1985.
European Search Report dated Jan. 11, 1993.

Primary Examiner—David C. Nelms
Assistant Examiner—Que T. Le
Attorney, Agent, or Firm—Finnegan, Henderson, Farabow, Garrett & Dunner

[57] ABSTRACT

An object of this invention is to provide a position detecting apparatus which can accurately detect an angle of rotation of a rotary board mounted on a rotary shaft even if the former is not coaxial with the latter, or there is a play between the rotary shaft and its bearing. In a position detecting apparatus, a detecting transparent slit is formed in it in such a manner that the distance between the slit and the center of rotation of the rotary board changes with the angle of rotation $\theta$ of the rotary board, and a reference transparent slit having a predetermined radius is also formed in it. LEDs are arranged on one side of the rotary board, and PSDs are arranged on the other side of the rotary board in such a manner the formers are confronted through the transparent slits with the PSDs, respectively. The PSDs detect light beams passed through the transparent slits, to output light reception signals. The difference between those light reception signals is calculated to obtain the relative distance thereof to detect the angle of rotation $\theta$ of the rotary board. Hence, even if the rotary board is not coaxial with the rotary shaft, or there is a play between the rotary shaft and its bearing, the angle of rotation $\theta$ of the rotary board can be detected with high accuracy.

12 Claims, 16 Drawing Sheets

ECCENTRICITY-COMPENSATED POSITION DETECTING APPARATUS HAVING AN IDENTIFYING TRANSPARENT SLIT

BACKGROUND OF THE INVENTION

This invention relates to a position detecting apparatus in which a light emitting element and a light receiving element are provided on both sides of a rotary board mounted on a rotary shaft, and the angular position of the rotary board, or angle of rotation thereof, is detected from a light reception signal outputted by the light receiving element.

One example of a conventional position detecting apparatus of this type will be described with reference to FIG. 10. As shown in FIG. 10, a rotary board 2 made of glass or plastic material is mounted on a rotary shaft 1, and an opaque layer 3 is formed on the surface of the rotary board 2. The opaque layer 3 is partially removed to form a spiral slit 4. The configuration of the slit 4 is so determined as to meet the following equation:

$$r = a \times \theta + b \qquad (1)$$

where r is the distance between the center of the rotary shaft 1 and the slit 4, $\theta$ is the angle measured counterclockwise from the reference angle (0°), and a and b are the constants determined from the configuration of the slit 4.

A light emitting element (not shown), and a light receiving element 5 are arranged both sides of the slit 4, respectively. The light receiving element 5 comprises a position sensing detector (hereinafter referred to as "a PSD", when applicable) the detecting direction of which is a direction of radius of the rotary shaft 1. The light receiving element 5 outputs a light reception signal according to the position of the light beam on it (hereinafter referred to as "a light receiving position", when applicable) which is applied thereto by the light emitting element.

When, in the apparatus thus constructed, the rotary board 2 is rotated, the position of a light beam applied from the light emitting element through the slit 4 to the light receiving element 5 is moved in the direction of radius, i.e., in the detecting direction of the light receiving element 5; that is, the light receiving position on the light receiving element 5 changes with the above-described Equation (1). Hence, the angle of rotation $\theta$ of the rotary board 2 can be determined by detection of the light reception signal.

However, in the above described conventional position detecting apparatus, the detecting operation is carried out under the condition that the level of the signal reception signal outputted by the light receiving element is proportional to the angle of rotation of the rotary board. Therefore, in the case where, the rotary board is not coaxial with the rotary shaft or there is a play between the rotary shaft and its bearing, the distance (r) from the center of rotation do not meet the above-described Equation (1). Therefore, similarly as in the above-described case, the level of the light reception signal outputted by the light receiving element is not proportional to the angle of rotation of the rotary board, and the angle of rotation of the rotary board detected from the light reception signal is not correct.

SUMMARY OF THE INVENTION

A first object of the invention is to provide a position detecting apparatus which, even when a rotary board is unstable in position because it is not coaxial with a rotary shaft, or there is a play between the rotary shaft and its bearing, can detect an angle of rotation of the rotary board with high accuracy.

A second object of this invention is to provide a position detecting apparatus for detecting the position of an object from the difference between the output signals of at least one pair of semiconductor position detecting elements, which, using no dividers, is low in manufacturing cost, and yet able to achieve the detecting operation with high accuracy.

A third object of this invention is to provide an position detecting apparatus which is simple in construction and low in manufacturing cost, and yet is able to detect all angles of rotation $\theta$ of the rotary shaft up to 360° with high accuracy.

According to a first aspect of the present invention, there is provided a position detecting apparatus which comprises: a rotary board mounted on a rotary shaft, the rotary board having a ring-shaped reference transparent slit having a predetermined radius, and a detecting transparent slit which is extended in the direction of rotation of the rotary board in such a manner that the distance between the detecting transparent slit and the center of rotation of the rotary board changes continuously; a light emitting element for applying light to the reference transparent slit and the detecting transparent slit; a reference light receiving element which is so arranged as to confront with the light emitting element through the rotary board, and receives a light beam passed through the reference transparent slit, to detect a light receiving position in a direction of radius of the rotary board to output a light reception signal; a detecting light receiving element which is so arranged as to confront with the light emitting element through the rotary board, and receives a light beam passed through the detecting transparent slit, to detect a light receiving position in a direction of radius of the rotary board to output a light reception signal; and arithmetic means for calculating an angle of rotation of the rotary board by using the light reception signals outputted by the reference light receiving element and the detecting light receiving element.

Further, according to the present invention, there is provided a position detecting apparatus which comprises: a rotary board mounted on a rotary shaft, the rotary board having a ring-shaped reference transparent slit having a predetermined radius, and a detecting transparent slit which is extended in a direction of rotation of the rotary board in such a manner that the distance between the detecting transparent slit and the center of rotation of the rotary board changes continuously; first and second light emitting elements spaced a predetermined angle from each other in a direction of rotation of the rotary board, for applying light beams to the reference transparent slit and the detecting transparent slit, respectively, first and second reference light receiving elements which are so arranged as to confront with the first and second light emitting elements through the rotary board, and receive light beams passed through the reference transparent slit, to detect light receiving positions in directions of radius of the rotary board to output light reception signals, respectively; first and second detecting light receiving elements which are so arranged as to confront with the light emitting element through the rotary board, and receive light beams passed through the detecting transparent slit, to detect light receiving positions in directions of radius of the rotary board to output light reception signals, respectively; and arithmetic means for calculating an angle of rotation of the rotary board by using the light reception signals outputted by the first and second reference light receiving elements and the first and second detecting light receiving elements.

With the position detecting apparatus according to the first aspect of the present invention, the angle of rotation of the rotary board is detected as follows: The reference transparent slit formed in the rotary board is annular. Therefore, even when the rotary boards is turned, the position of the light beam on the light receiving element which is applied thereto through the reference transparent slit by the light emitting element is maintained constant radially of the rotary board. On the other hand, the detecting transparent slit is so formed in the rotary board that its distance from the center of rotation of the rotary board changes continuously. Therefore, when the rotary board is turned, the position of the light beam on the detecting light receiving element which is applied thereto through the detecting transparent slit by the light emitting element, is shifted continuously radially of the rotary board with the angle of rotation of the latter. Thus, the arithmetic means calculates the difference between the light reception signals outputted by the reference light receiving element and the detecting light receiving element, to detect a value corresponding to the angular position of the rotary board.

In the case where the rotary board is mounted on the rotary shaft in such a manner that the former is not coaxial with the latter, or there is a play between the rotary shaft and its bearing, the rotation of the rotary board is unstable. In this case, the position of the light beam on the reference light receiving element which is applied thereto through the reference transparent slit changes with the angle of rotation of the rotary board. That is, the light reception signal provided by the reference light receiving element, being different from the above-described one, is not constant in level; that is, the reference light receiving element outputs a light reception signal which is variable in level. However, even in this case, the positional relationship between the reference transparent slit and the detecting transparent slit is, of course, not changed at all. Hence, similarly as in the above-described case, the arithmetic means calculates the difference between the light reception signals outputted by the reference light receiving element and the detecting light receiving element, to accurately detect a value corresponding to the angular position of the rotary board.

With the position detecting apparatus according to the present invention, the angular position or angle of rotation of the rotary board is detected as follows: That is, in the apparatus, the detecting transparent slit is so formed in the rotary board that the light reception signal outputted by the detecting light receiving element has the same value at least twice during one revolution of the rotary board. More specifically, the detecting transparent slit is in the form of a ring the center of which is shifted from the center of rotation of the rotary board.

The first and second detecting light receiving elements are spaced a predetermined angle from each other in the direction of rotation of the rotary board, so that the light reception signals provided by those detecting light receiving elements are shifted in phase from each other. Therefore, even in the case where only one detecting light receiving element is provided so that the light reception signal provided thereby has the same value twice during one revolution of the rotary board, the apparatus can detect the angle of rotation of the rotary board from the difference between the light reception signals which are provided by the first and second light receiving elements as the rotary board makes one revolution.

Similarly as in the above-described apparatus, even in the case where the rotary board is off-centered, or suffers from play, the arithmetic means performs an operation by using the light reception signals outputted by the first and second light receiving elements, to detect the aimed angle of rotation of the rotary board with high accuracy.

The second object of the invention has been achieved by the provision of a position detecting apparatus which comprises at least first and second semiconductor position detecting elements adapted to receive, as light spots, light beams outputted by light emitting units which are moved in a direction of detection as an object under test moves, to detect a position of the object from the difference between output signals of the semiconductor position detecting elements, which, according to the invention, comprises: first and second adders provided for the first and second semiconductor position detecting elements, respectively, the first adder calculating the sum of two output signals of the first semiconductor position detecting element, the second adder calculating the sum of two outputs of the second semiconductor position detecting element; a subtracter for subjecting to subtraction one of the two outputs of the first semiconductor position detecting element and one of the two outputs of the second semiconductor position detecting element; and first and second feedback circuits, the first feedback circuit calculating the difference between an output of the first adder and a reference voltage, the second feedback circuit calculating the difference between an output of the second adder and the reference voltage so that in each of the semiconductor position detecting elements, a quantity of light received from the respective light emitting unit be constant, the output of the subtracter being utilized to detect the position of the moving object under test. Further, according to the present invention, there is provided a position detecting apparatus comprising a casing, a rod arranged to said casing to move said casing in linear direction, a slit plate secured on said rod, said slit plate having a reference transparent slit extending in substantially the same direction of a movement of said rod and a detecting transparent slit formed in such a manner that a distance between said reference transparent slit and said detecting transparent slit changes continuously, light emitting means for applying light beam to said reference transparent slit and said detecting transparent slit, light receiving means for receiving said light beam passed through said reference transparent slit and passed through said detecting transparent slit to detect light receiving positions of said rod to output light reception signals in accordance with said light reception positions of said reference transparent slit and said detecting transparent slit, respectively, said light receiving means being arranged to confront with said light emitting means, and arithmetic means for calculating a position of said rod in accordance with said light reception signals.

In the position detecting apparatus of the invention, the light beams emitted from the light emitting units are applied, as light spots, to the light receiving surfaces of the semiconductor position detecting elements at points corresponding to the position of the moving object.

Each of the adders calculates the sum of two outputs of the respective semiconductor position detecting element and applies it to the respective feedback circuit. The feedback circuits calculate the differences of the outputs of the adders from the reference voltage, respectively, to control the drive currents applied to the light emitting units so that the quantities of light applied to the semiconductor position detecting elements from the light emitting units be constant. That is, control is so made that the sum of the two outputs of one of the semiconductor position detecting elements, and the sum of the two outputs of the other are constant and equal to each other. Therefore, when one of the two outputs of the one semiconductor position detecting element and one of the two outputs of the other semiconductor position detecting elements are subjected to subtraction in the subtracter, the output of the latter corresponds directly to the relative positional difference. Thus, the apparatus, needing no dividers, is simple in construction and accordingly low in manufacturing cost, and yet is able to detect the position of the moving object with high accuracy.

The third object of the invention has been achieved by the provision of a position detecting apparatus which, according to the invention, comprises: a rotary board fixedly mounted on a rotary shaft, the rotary board having a reference transparent slit of a predetermined width which is in the form of a circular ring with a predetermined radius, and a detecting transparent slit having a predetermined width which is so shaped that the detecting transparent slit extends circumferentially of the rotary board and the distance from the center of rotation of the rotary board changes continuously; a light emitting element for emitting light beams towards the reference transparent slit and the detecting transparent slit, respectively; a reference semiconductor position detecting element confronted through the rotary board with the light emitting element, to receive a light beam through the reference transparent slit, to detect a light reception position in a radial direction of the rotary board; a detecting semiconductor position detecting element confronted through the rotary board with the light emitting element, to receive a light beam through the detecting transparent slit, to detect a light reception position in a radial direction of the rotary board; and arithmetic means for calculating an angle of rotation of the rotary board by using light reception signals provided by the reference semiconductor position detecting element and the detecting semiconductor position detecting element, one of the detecting transparent slit and reference transparent slit of the rotary board including identifying transparent slit means different in width therefrom at an angular position where both ends of the detecting transparent slit are radially staggered from each other.

With the position detecting apparatus of the invention, all angles of rotations of the rotary board can be detected with high accuracy as follows: The reference transparent slit of the rotary board is in the form of a circular ring having a predetermined radius. Therefore, even when the rotary board turns, the position of the output light beam of the light emitting element formed as a light spot on the reference semiconductor position detecting element is maintained unchanged in a radial direction of the rotary board. On the other hand, the detecting transparent slit is so shaped that the distance from the center of rotation changes continuously. Therefore, as the region of the rotary board except the particular region (close to 0°) where the two ends of the detecting transparent slit are radially staggered from each other reaches the semiconductor position detecting element while the rotary board turns, the position of the output light beam of the light emitting element formed as a slight spot on the detecting semiconductor position detecting elements changes continuously with the angle of rotation.

Hence, the arithmetic means operates to calculate the difference between the position detected from the light reception signal of the reference semiconductor position detecting element and that detected from the light reception signal of the detecting semiconductor position detecting element, thereby to obtain a value corresponding to the angle of rotation of the rotary board. Even if, in this case, there is a play between the rotary board and the bearing on the rotary shaft, or the rotary board is not coaxial with the rotary shaft, the relative distance between the reference transparent slit and the detecting transparent slit, corresponding to the angle of rotation of the rotary board, is free from error, and therefore the angle of rotation of the rotary board can be detected with high accuracy.

In the particular region of the rotary board where the two ends of the detecting transparent slit are radially staggered from each other, the position of the light spot on the detecting semiconductor position detecting element is abruptly changed. In this case, since the light beam applied to the semiconductor position detecting element from the light emitting element is somewhat divergent, the level of the signal detected is substantially continuously changed from the value which is obtained at the start of the particular region (where the angle of rotation $\theta$ is slightly smaller than 360°) and that obtained at the end of the particular region (where the angle of rotation $\theta$ is 0°).

In the particular region of the rotary board, the reference transparent slit or the detecting transparent slit includes the identifying transparent slit different in width. Therefore, when the particular region comes to the semiconductor position detecting element, the total quantity of light received by the latter changes. Thus, by detecting the quantify of light received through the identifying transparent slit, it can be detected that the particular region of the rotary board reaches the semiconductor position detecting element; that is, the angle of rotation is close to 0°. Hence, the signal outputted by the arithmetic means can be discriminated even if it is equal in level to the preceding signal. Thus, with the apparatus of the invention, all angles of rotation of the rotary board can be detected with high accuracy.

DETAILED DESCRIPTION OF THE PREFERRED EMBODIMENTS

Preferred embodiments of this invention, having the technical concept of the invention applied to the angle-of-rotation detecting apparatus, will be described with reference to the accompanying drawings.

A first embodiment of the invention will be described with reference to FIGS. 1 and 2. In the first embodiment, a rotary shaft 21 is rotatably supported by a casing 22, and it is rotated by an object (not shown) under test turns. A rotary board 23 is fixedly mounted on the rotary shaft 21. The rotary board 23 is essentially made of a transparent material such as glass or plastic. A metal film such as a chromium film is formed, as an opaque layer 24, on the surface of the rotary board 23.

Figure 1:
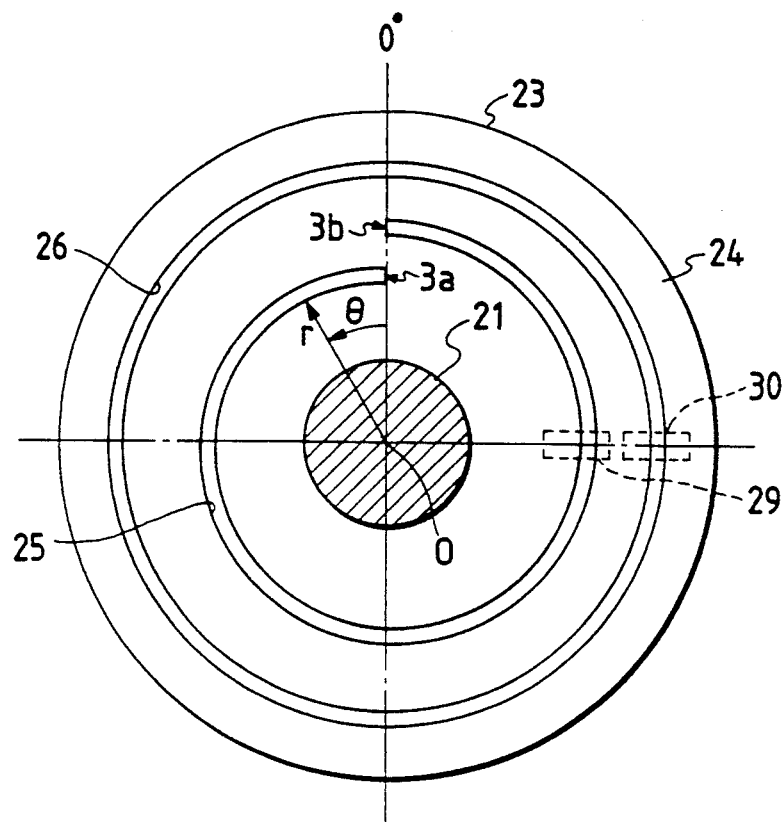
FIG. 1 is a plan view showing a rotary board in a first embodiment of this invention.
Figure 2:
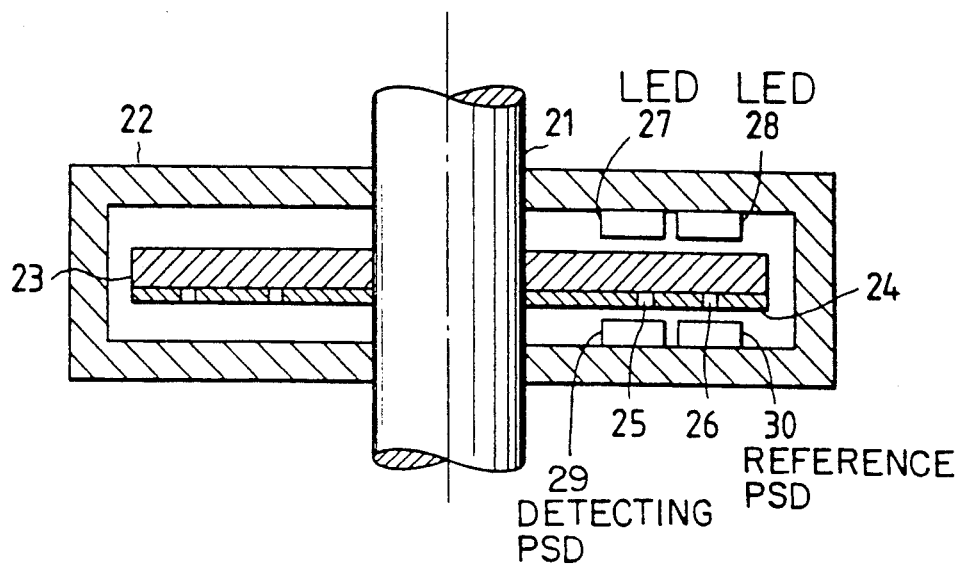
FIG. 2 is a sectional view showing essential components concerning the rotary board in the first embodiment.

As shown in FIG. 1, the opaque layer 24 is partially removed by etching, to form a detecting transparent slit 25 and a reference transparent slit 26. The reference transparent slit 26 is in the form of a circle having a predetermined radius with its center at the center of rotation of the rotary board 23. The detecting transparent slit 25 is located inside the reference transparent slit 26, and is spiral. That is, the detecting transparent slit 25 is so shaped that the distance (r) between the detecting transparent slit and the center of rotation of the rotary board 23 changes continuously in proportion to the angle of rotation $\theta$ measured from the reference position ($\theta = 0°$); that is, the configuration of the detecting transparent slit 25 meets the following Equation (2):

$$r = a \times \theta + b \tag{2}$$

where a and b are the constants determined from the configuration of the detecting transparent slit 25.

Light emitting elements, namely, LEDs (light emitting diodes) 27 and 28 are mounted on the upper wall of a chamber defined by the casing 22. A detecting light receiving element, namely, a detecting PSD 29, and a reference light receiving element, namely, a reference PSD 30 are mounted on the lower wall of the chamber so as to detect light receiving positions in a direction of radius of the rotary board 23. That is, the LED 27 and the detecting PSD 29 are arranged on both sides of the rotary board 23, respectively, in such a manner that they are confronted with each other through the detecting transparent slit 25; whereas the LED 28 and the reference PSD 30 are also arranged on both sides of the rotary board 23, respectively, so that they are confronted through the reference transparent slit 26.

Figure 3:
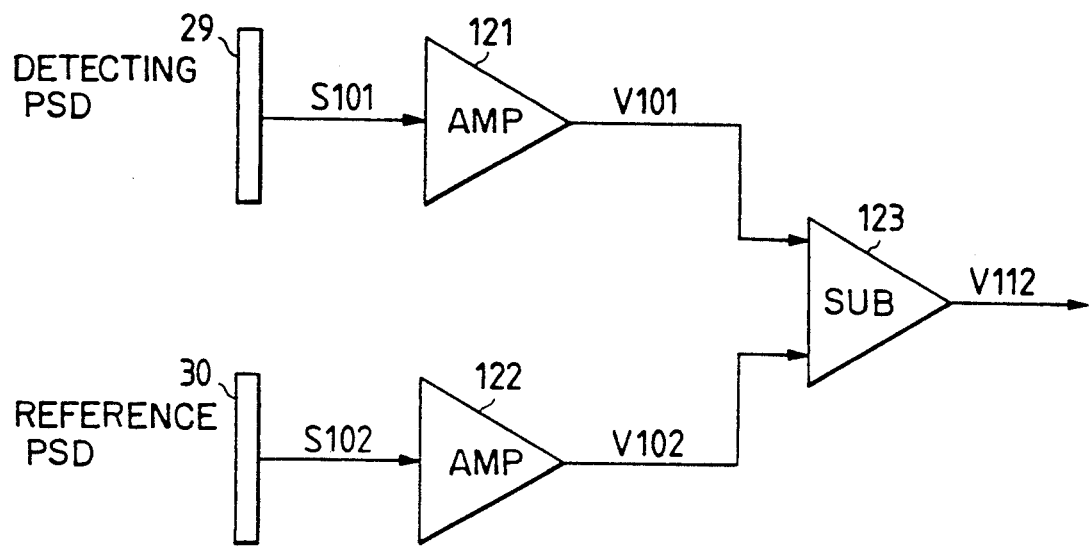
FIG. 3 is a block diagram showing one electrical circuit in the first embodiment.

FIG. 3 is one block diagram showing the electrical arrangement of essential components in the first embodiment. The output terminals of the detecting PSD 29 and the reference PSD 30 are connected respectively through amplifiers 121 and 122 to arithmetic means, namely, a subtracter 123. The amplifiers 121 and 122 amplify current signals S101 and S102 applied thereto from the PSDs 29 and 30, to output voltage signals V101 and V102, respectively. Those voltage signals V101 and 102 are applied to the subtracter 123, where they are subjected to subtraction; that is, the subtracter performs an operation $V112 = V101 - V102$.

Figure 11:
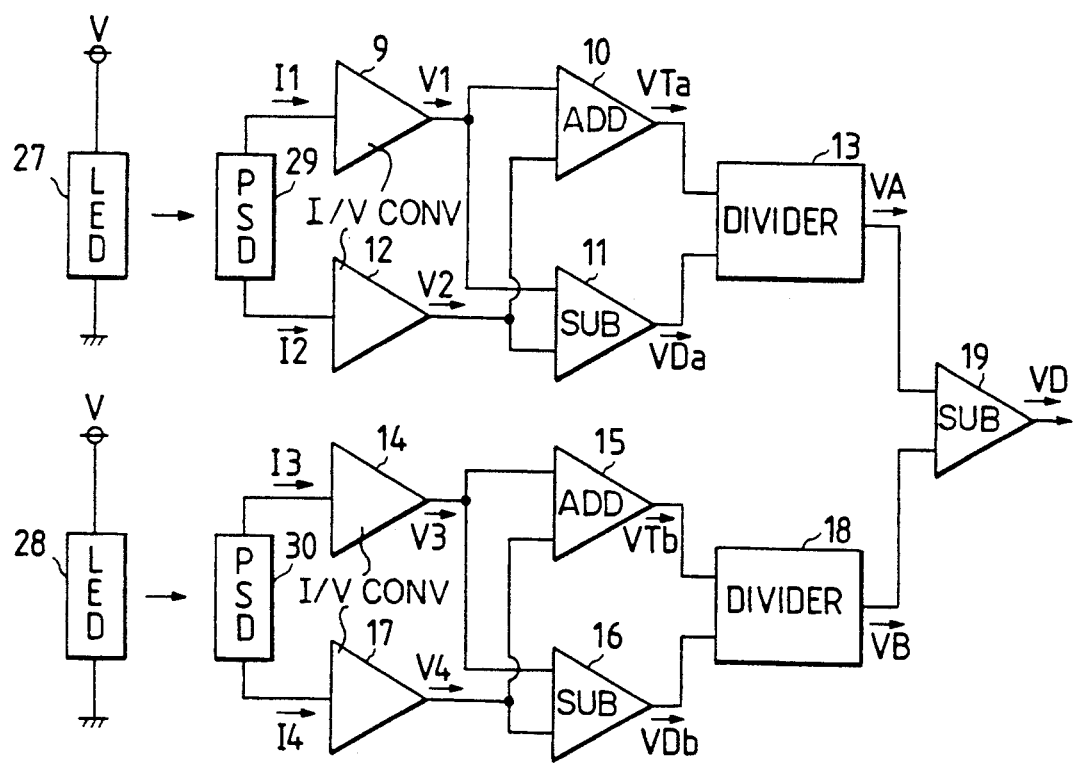
FIG. 11 is a block diagram showing the other electrical circuit in the first embodiment.

FIG. 11 is the other block diagram showing the electrical arrangement of essential components in the first embodiment as shown in FIG. 1. A predetermined DC source applies constant current to the LEDs 27 and 28, so that the latter 27 and 28 emit light beams constant in optical intensity. A first output current I1 of the detecting PSD 29 is applied to a current-to-voltage conversion circuit 9, where it is converted into a voltage signal V1. The voltage signal V1 is applied to an adder 10 and a subtracter 11. A second output current I2 of the detecting PSD 29 is applied to a current-to-voltage conversion circuit 12, where it is converted into a voltage signal V2. The voltage signal V2 is applied to the adder 10 and the subtracter 11.

In a divider 13, a voltage signal VDa ($= V1 - V2$) corresponding to the difference ($I1 - I2$) between the detected currents received from the subtracter 11 is divided by a voltage signal VTa ($= V1 + V2$) corresponding to the sum ($I1 + I2$) of the detection currents received from the adder 10; that is, the total quantity of light received. The result of division is outputted as a voltage signal VA.

On the other hand, a first output current I3 of the detecting PSD 30 is applied to a current-to-voltage conversion circuit 14, where it is converted into a voltage signal V3. The voltage signal V3 is applied to an adder 15 and a subtracter 16. A second output current I4 of the detecting PSD 30 is applied to a current-to-voltage conversion circuit 17, where it is converted into a voltage signal V4. The voltage signal V4 is applied to the adder 15 and the subtracter 16.

In a divider 18, a voltage signal VDb (=V3−V4) corresponding to the difference (I3−I4) between the detected currents received from the subtracter 16 is divided by a voltage signal VTb (=V3+V4) corresponding to the sum (I3+I4) of the detected currents received from the adder 15; that is, the total quantity of light received. The result of division is outputted as a voltage signal VB. In a subtracter 19, the voltage signal VB outputted by the divider 18 is subtracted from the voltage signal VA outputted by the divider 13, so that a voltage signal VD (=VA−VB) is obtained which corresponds to the movement.

In the above-described apparatus, the rotary board 23 is turned together with the rotary shaft 21. As the rotary board 23 is turned, the detecting transparent slit 25 is radially moved, so that the light beam from the LED 27 is applied to the light receiving surface of the detecting PSD 29 at a point corresponding to an angle of rotation of the rotary board. On the other hand, in this operation, the reference transparent slit 26 is not moved in a radial direction, so that the light beam from the LED 28 is kept applied to a fixed point on the light receiving surface of the reference PSD 30.

In this operation, the adder 10 outputs the sum of the voltage signals V1 and V2 corresponding to the values of the currents I1 and I2 provided at the output terminals of the detecting PSD 29, and the subtracter 11 outputs the difference between the voltage signals V1 and V2. That is, the adder 10 provides the voltage signal VTa corresponding to the total quantity of light received from the LED 27, and the subtracter 11 provides the voltage signal VDa corresponding to the deviation from the central position.

Similarly, the adder 15 outputs the sum of the voltage signals V3 and V4 corresponding to the values of the currents I3 and I4 provided at the output terminals of the detecting PSD 30, and the subtracter 16 outputs the difference between the o voltage signals V3 and V4. That is, the adder 15 provides the voltage signal VTb corresponding to the total quantity of light received from the LED 28, and the subtracter 16 provides the voltage signal VDb corresponding to the deviation from the central position.

Hence, when the light beam from the LED 27 is applied to a point d1 on the light receiving surface of the detecting PSD 29, the voltage signal VA outputted by the divider 13 is:

$$VA = VDa/VTa \quad (a)$$
$$= (V1 - V2)/(V1 + V2)$$

Being proportional to the light receiving position d1, the voltage signal VA can be represented as follows:

$$VA = C1\ d1 \quad (b)$$

where C1 is the proportional constant.

On the other hand, when the light beam from the LED 28 is applied to a point d2 on the light receiving surface of the reference PSD 30, the voltage signal VB outputted by the divider 18 is:

$$VB = VDb/VTb \quad (c)$$
$$= (V3 - V4)/(V3 + V4)$$

Being proportional to the light receiving point b1, the voltage signal VB can be represented as follows:

$$VB = C1\ d2 \quad (d)$$

where C2 is the proportional constant.

From the above-described Equations (b) and (d), the output signal VD of the subtracter 19 is:

$$VD = VA - VB \quad (e)$$
$$= C1\ d1 - C2\ d2$$

Therefore, when C1 and C2 are made equal to each other by adjusting the dividers 13 and 18, $$VD = C1\ (d1 - d2) \quad (f)$$

Thus, with the aid of the voltage signal VD, the difference between the detection positions d1 and d2 of the PSDs 29 and 30; that is, the relative distance thereof can be detected. More specifically, the positional relation between the detecting transparent slit 25 and the reference transparent slit 26 corresponding to the angle of rotation of the rotary board 23 can be obtained.

The apparatus is designed as described above. Hence, even in the case where there is a play between the rotary board 23 and the rotary shaft 21, the detecting transparent slit 25 and the reference transparent slit 26 of the rotary board 23 are maintained unchanged in positional relation, and therefore the values of the detection distances d1 and d2 corresponding to the angle of rotation of the rotary shaft are shifted as much as one and the same value Δd in the same direction. However, the voltage signal VD represented by the above-described Equation (f) is free from the amount of shift Δd; that is, owing to the subtraction done by the subtracter 19, the amount of shift Δd is canceled out. Thus, the voltage signal VD corresponds to (d1−d2) with high accuracy at all times.

The operation of the first embodiment will be described with reference to FIG. 4 as well.

As an object under test (not shown) turns, the rotary shaft 21 and accordingly the rotary board 23 is turned; that is, the detecting transparent slit 25 and the reference transparent slit 26 are turned. The reference transparent slit 26 is in the form of a ring having its center at the center of rotation of the rotary board 23. Hence, theoretically when the reference transparent slit 26 is being turned, the position of the light beam is maintained unchanged which is applied to the reference PSD 30 through the reference transparent slit 26 by the LED 28.

On the other hand, the detecting transparent slit 25 turned together with the rotary board 23 is spiral as its distance (r) from the center of rotation of the rotary board changes according to the above-described Equation (2). Hence, the position of the light beam which is applied to the PSD 29 through the detecting transparent slit 25 by the LED 27 changes continuously with the angle of rotation θ of the rotary board. 23.

Therefore, from Equation (2), the light reception signal S101 outputted by the detecting PSD 29 is:

$$S101 = A \times \theta + B \tag{3}$$

where A and B are the constants. On the other hand, the light reception signal S102 outputted by the reference PSD 30 is as follows:

$$S102 = C \ (constant) \tag{4}$$

The light reception signals S101 and S102 are applied to the amplifiers 121 and 122, respectively, where they are amplified and then converted into voltage signals V101 and V102, respectively, which are applied to the subtracter 123. The subtracter 123 performs a subtraction (V101−V102) to provide an output signal V112. That is, the output signal V112 thus provided corresponds to the result S12 of the subtraction (S101−S102).

Thus, from Equations (3) and (4), $$\begin{aligned} S12 &= S101 - S102 \\ &= A \times \theta + (B - C) \\ &= A \times \theta + D \end{aligned} \tag{5}$$

The value S12; that is, the output V112 of the subtracter 123 is proportional to the angle of rotation $\theta$ (D (=B−C) being the constant).

Figure 4:
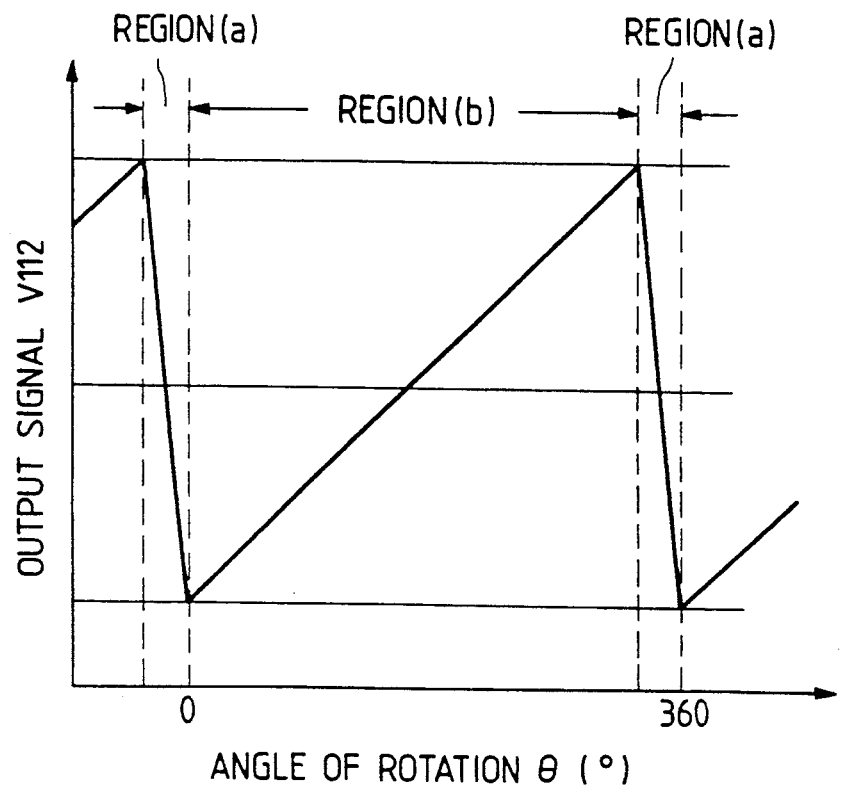
FIG. 4 is a graphical representation for a description of an output signal in the first embodiment.

Accordingly, the angle of rotation $\theta$ of the rotary board relates to the output V112 of the subtracter 123 as indicated in FIG. 4. That is, the angles of rotation $\theta$ of the rotary board 23 in a range of from the reference angle (0°) near to 360° can be detected.

On the other hand, in the case where the rotary board 23 is not coaxial with the rotary shaft, or the rotation of the rotary board 23 is unstable because there is a play between the rotary shaft 21 and bearings on the casing 22, the light receptions signals S101 and S102 outputted by the PSDs 29 and 30 are unstable, thus not satisfying the above-described Equations (3) and (4).

However, even in this case, the relative position of the detecting transparent slit 25 and the reference transparent slit 26 is not changed at all. Hence, the light reception signals S101 and S102 of the PSDs 29 and 30 are outputted as signals which are equally increased or decreased as much as the eccentricity of the rotary board 23.

If it is assumed that, with respect to an angle of rotation $\theta$, the light reception signals S101 and S102 are shifted as much as $\Delta S$ because of the eccentricity of the rotary board 23, then the above-described Equations (g) and (h) can be rewritten as follows:

$$S1 = A \times \theta + B + \Delta S \tag{j}$$

$$S2 = C + \Delta S \tag{k}$$

When Equations (j) and (k) are substituted in the above-described Equation (i) to obtain the signal S12 corresponding to the output V112 of the subtracter 123, then the amount of shift $\Delta S$ due to the eccentricity of the rotary board 23 is canceled. This is equal to the case where Equation (i) is directly used.

In other words, even in the case where the light reception signals include the amount of shift $\Delta S$ because of the eccentricity of the rotary board 23, the relative position of the detecting transparent slit 25 and the reference transparent slit 26 is not changed at all, and therefore the amount of shift $\Delta S$ is eliminated when the subtracter 123 performs the subtraction. Hence, the result of detection is the same as that in the case where the rotary board is coaxial with the rotary shaft.

In the above-described first embodiment, the rotary board has the detecting transparent slit 25 and the reference transparent slit 26, and the positions of the light beams passing through those slits are detected, so that the angle of rotation $\theta$ of the rotary board 23 is detected from the difference between those positions. Hence, even when the position of the light beam passing through the detecting transparent slit 25 is unstable as in the case where the rotary board 23 is not coaxial with the rotary shaft 21 or there is a play between the rotary shaft and the rotary board, the angle of rotation $\theta$ of the rotary board 23 can be detected in all angles of rotation $\theta$ of the rotary shaft up to 360° with high accuracy.

Figure 5:
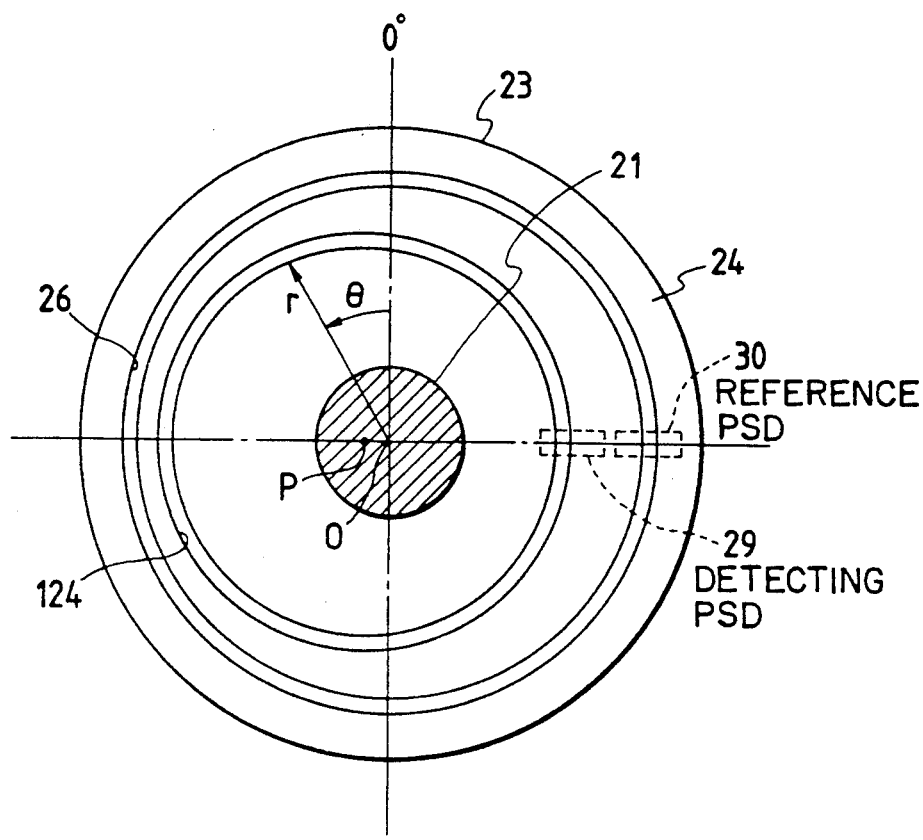
FIG. 5 is a plan view showing a rotary board in a second embodiment of the invention.
Figure 6:
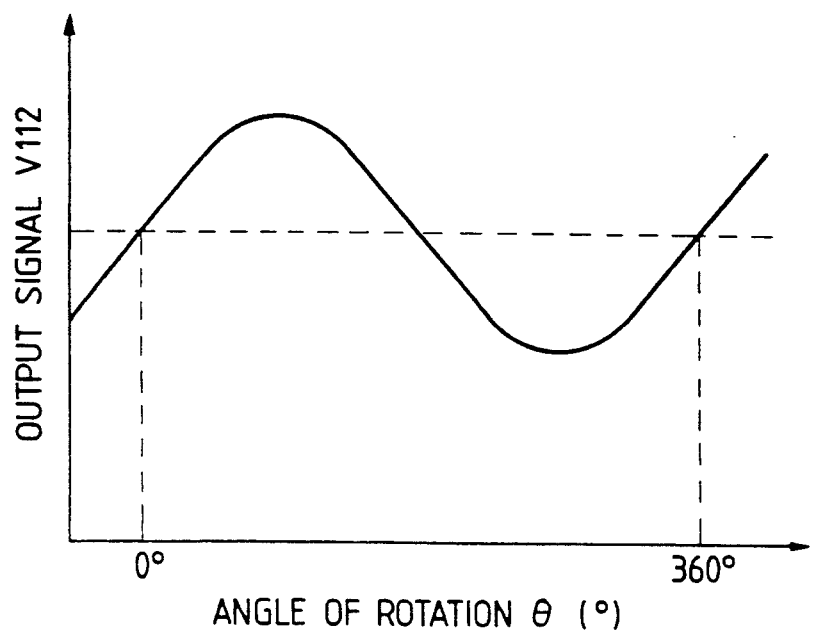
FIG. 6 is a graphical representation for a description of light reception signals in the second embodiment.

FIGS. 5 and 6 show a second embodiment of the invention. For simplification in description, only parts different from those of the first embodiment will be described. In the second embodiment, in place of the detecting transparent slit 25 which is spiral in the first embodiment, a detecting transparent slit 124 which is in the form of a ring is employed. The center of the detecting transparent slit 124 is slightly shifted from the center of rotation 0 of the rotary board 23.

With the detecting transparent slit 124, the distance (r) between the center of rotation 0 of the rotary board 23 and the detecting transparent slit 124 changes with the angle of rotation of the rotary board 23 as follows:

$$r = a \times \sin \theta + b \tag{8}$$

where a and b are the constants determined from the configuration of the detecting transparent slit 124.

Hence, the position of the light beam which, when the rotary board 23 turns, is received through the detecting transparent slit 124 by the detecting PSD 29 changes while satisfying the above-described Equation (8). In this case, the light reception signal S101 outputted by the detecting PSD 29 changes according to the following Equation (9) base on Equation (8):

$$S101 = A \times \sin \theta + B \tag{9}$$

where A and B are the constants.

On the other hand, the reference PSD 30 receives a light beam through the reference transparent slit 26 to provide the light reception signal S102. The light reception signal S102 is constant similarly as in the above-described first embodiment. Therefore, when the subtracter 123 performs the subtraction, the detection signal S12 outputted by the subtracter 123 changes, like a sine curve, with the angle of rotation $\theta$ of the rotary board as shown in FIG. 6. Hence, the angle of rotation $\theta$ of the rotary board 23 can be univocally determined, in a range of ±90° (from 0° to 180°) from the detection signal S12.

The second embodiment is also so designed that the light beam passed through the detecting transparent slit 124 is received by the detecting PSD 29, while the light beam passed through the reference transparent slit 26 is received by the reference PSD 30, and the difference between the light reception signals outputted by the PSDs 29 and 30 is calculated, to detect the angle of rotation $\theta$ of the rotary board 23. Hence, similarly as in the case of the above-described first embodiment, even if the rotary board is off-centered, or suffers from a play, the angle of rotation of the rotary board can be detected with high accuracy.

Figure 7:
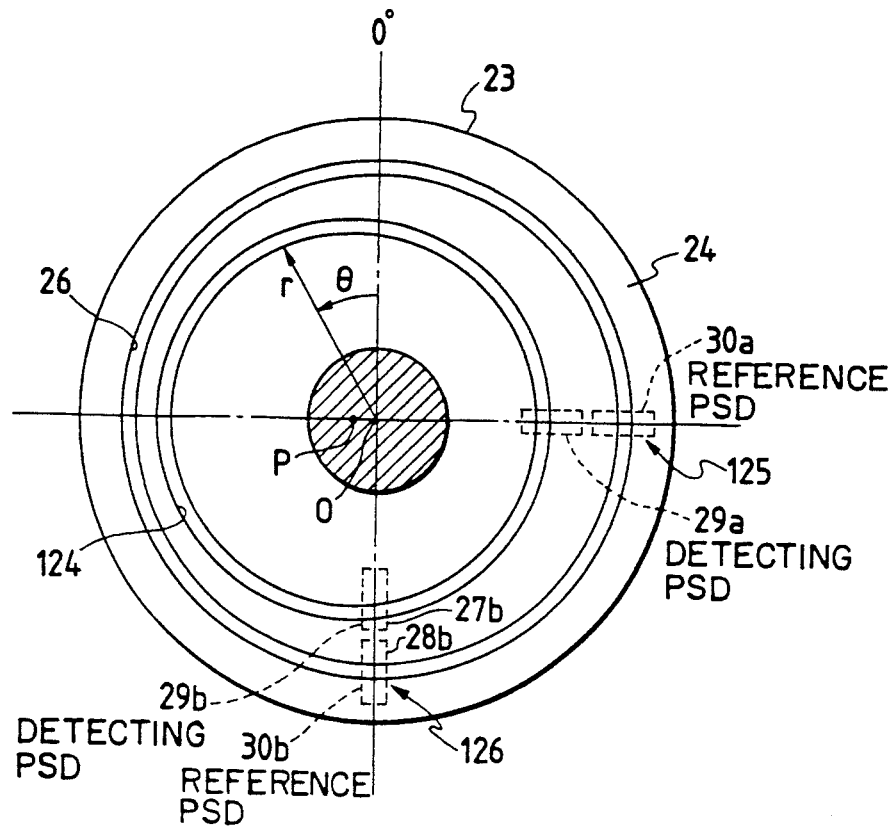
FIG. 7 is a plan view showing a rotary board in a third embodiment of the invention.
Figure 8:
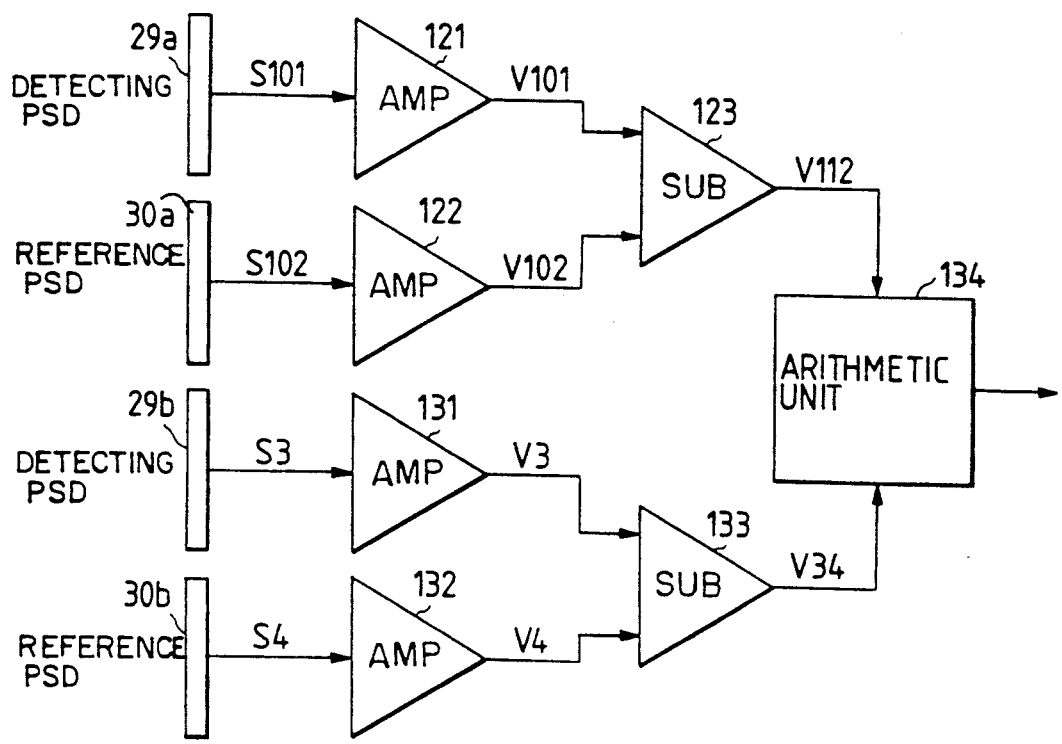
FIG. 8 is a block diagram showing an electrical circuit in the third embodiment.
Figure 9:
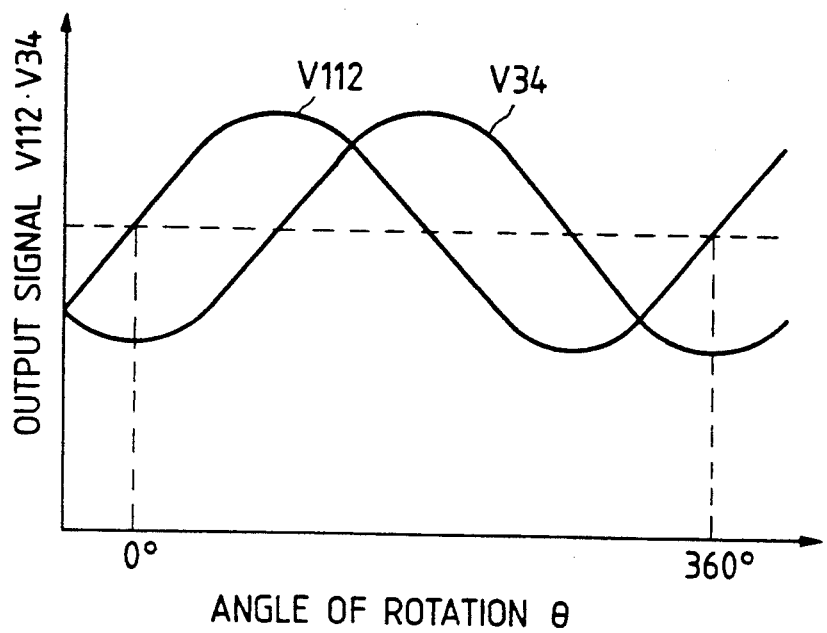
FIG. 9 is a graphical representation for a description of light reception signals in the third embodiment.
Figure 10:
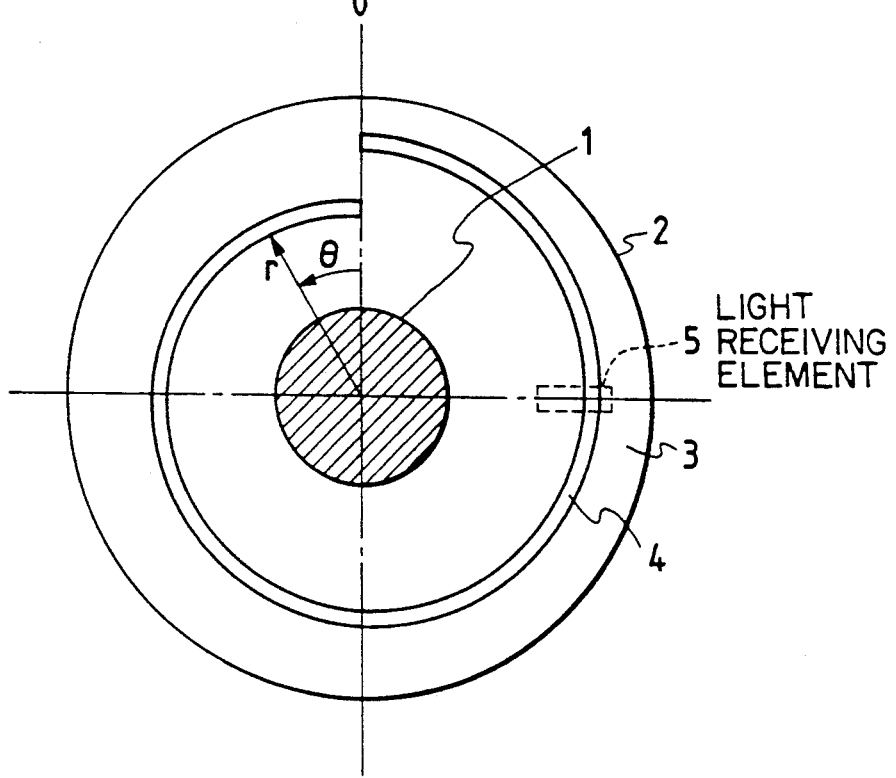
FIG. 10 is a plan view showing one example of the rotary board in the conventional apparatus.

FIGS. 7 through 9 show a third embodiment of the invention. For simplification in description, only parts different from those of the second embodiment will be described. In the second embodiment, the angles of rotation θ detected are ranged from 0° to 180°; whereas in the third embodiment, all the angles of rotation, from 0° to 360°, can be detected.

In FIG. 7, first light emitting elements, namely, LEDs 27a and 28a, and a first detecting light receiving element, namely, a detecting PSD 29a, and a first reference light receiving element, namely, a reference PSD 30a are provided for the rotary board 23. Those elements 27a, 28a, 29a and 30a form a first detecting section 125. In addition, a second detecting section 126 is provided; that is, it is spaced an angle of rotation of 90° from the first detecting section 125.

The second detecting section 126, similarly as in the first detecting section 125, comprises: second light emitting elements, namely, LEDs 27b and 28b, a second detecting light receiving element, namely, a detecting PSD 29b, and a second reference light receiving element, namely, a reference PSD 30b.

FIG. 8 is a block diagram showing the electrical arrangement of in the third embodiment. Roughly stated, the electrical circuit of the third embodiment includes two processing circuits each corresponding to the electrical circuit (FIG. 3) of the second embodiment. As shown in FIG. 8, the reference PSD 30b and the detecting PSD 29b are connected respectively through amplifiers to a subtracter 133. That is, light reception signals S3 and S4 outputted by the PSDs 29b and 30b are applied to the amplifiers 131 and 132, where they are amplified and converted into voltage signals V3 and V4, respectively. The voltage signals V3 and V4 are applied to the subtracter 133, where the difference between those voltage signals is calculated. The output terminals of the subtracters 123 and 133 are connected to an arithmetic unit 134, which calculates the angle of rotation of the rotary board 23.

In the third embodiment thus designed, the light reception signal S101 outputted by the detecting PSD 29a, similarly as in the case of the second embodiment, changes as a sine function according to Equation (9). Similarly, a light reception signal S3 provided by the detecting PSD 29b can be obtained as follows:

$$S3 = A \times \cos \theta + B \quad (10)$$

where A and B are the constants.
That is, light reception signal S3 changes as a cosine function.

FIG. 9 indicates those light reception signals with angles of rotation θ. The arithmetic unit 134 reads the polarities and values of the output signals of the subtracters 123 and 133, to univocally determine any angle of rotation θ occurring when the rotary board makes one revolution.

Hence, in the third embodiment, too, the amount of shift from the center of rotation of the rotary board 23 is detected with the aid of the reference PSDs 30a and 30b. Hence, similarly as in the cases of the first and second embodiments, even if the rotary board 23 is off-centered, or there is a play between the rotary board and the bearings on the rotary shaft, the angle of rotation θ can be detected accurately.

In the above-described first, second and third embodiments, the light emitting elements, namely, the LEDs 27 and 28 are set confronted with the detecting PSD 29a and the reference PSD 30a, respectively; however, the invention is not limited thereto or thereby. That is, the embodiments may be so modified that one light emitting diode is employed to apply light to both the PSDs 29a and 30a.

Furthermore in those embodiments, the light receiving elements are the PSDs 29a and 30a; however, the invention is not limited thereto or thereby. That is, they may be replaced by one-dimensional image sensors, or photo-potentiometers of CdS or CdSe.

In addition, in the embodiments, no optical systems are provided between the light emitting elements and the light receiving elements; however, it goes without saying that optical systems such as lenses may be arranged between them.

In the angle-of-rotation detecting apparatus according to the first embodiment, the rotary board has the reference transparent slit in addition to the detecting transparent slit, and the difference between the light reception signals outputted by the detecting light receiving element and the reference light receiving element is calculated to detect the angle of rotation of the rotary board. Hence, even when the rotary board is off-centered, or there is a play between the rotary shaft and its bearing, the angle of rotation of the rotary board can be detected with high accuracy.

In the angle-of-rotation detecting apparatus according to the second and third embodiments, even in the case where the level of the light reception signal outputted by the detecting light receiving element has the same value twice during one revolution of the rotary board, any angle of rotation of the rotary board in a range of from 0° to 360° can be detected. In addition, similarly as in the above-described apparatus, even when the rotary board is off-centered, or there is a play between the rotary shaft and its bearing, the angle of rotation of the rotary board can be detected with high accuracy.

Fourth to fifth embodiments of the present invention, as described hereinbelow provides certain advantages over the first embodiment, giving attention to the following characteristics of the first embodiment.

In practice, the above-described circuit as shown in FIG. 11, is generally made up of IC elements such as operational amplifiers. The circuit including the dividers 13 and 18 in the above-described manner suffers from the following difficulties:

The dividers 13 and 18, unlike the adders 10 and 15 and the subtracters 11 and 16, are each made up of a number of operational amplifiers. Therefore, they are intricate in circuitry, and accordingly expensive, thus increasing the manufacturing cost of the circuit.

In addition, the dividers 13 and 18 are, in general, not uniform in characteristic. Therefore, in order to make the proportional constants C1 and C2 equal to each other in the above-described Equation (e), it is necessary to adjust the characteristics of the dividers 13 and 18.

In practice, this adjustment is considerably difficult. Accordingly, the dividers are unavoidably expensive. In order to detect angles of rotation with higher accuracy, it is necessary to use dividers which are higher in manufacturing cost.

A fourth and fifth embodiments of this invention are to provide a position detecting apparatus for detecting the position of an object from the difference between the output signals of at least one pair of semiconductor position detecting elements, which, using no dividers, is low in manufacturing cost, and yet able to achieve the detecting operation with high accuracy.

A fourth embodiment of this invention, an angle-of-rotation detecting apparatus to which the technical concept of this invention is applied, will be described with reference to FIGS. 1, 2, 12 and 13.

In the fourth embodiment, for simplification in description, only parts different from those in the first embodiment will be described.

Figure 12:
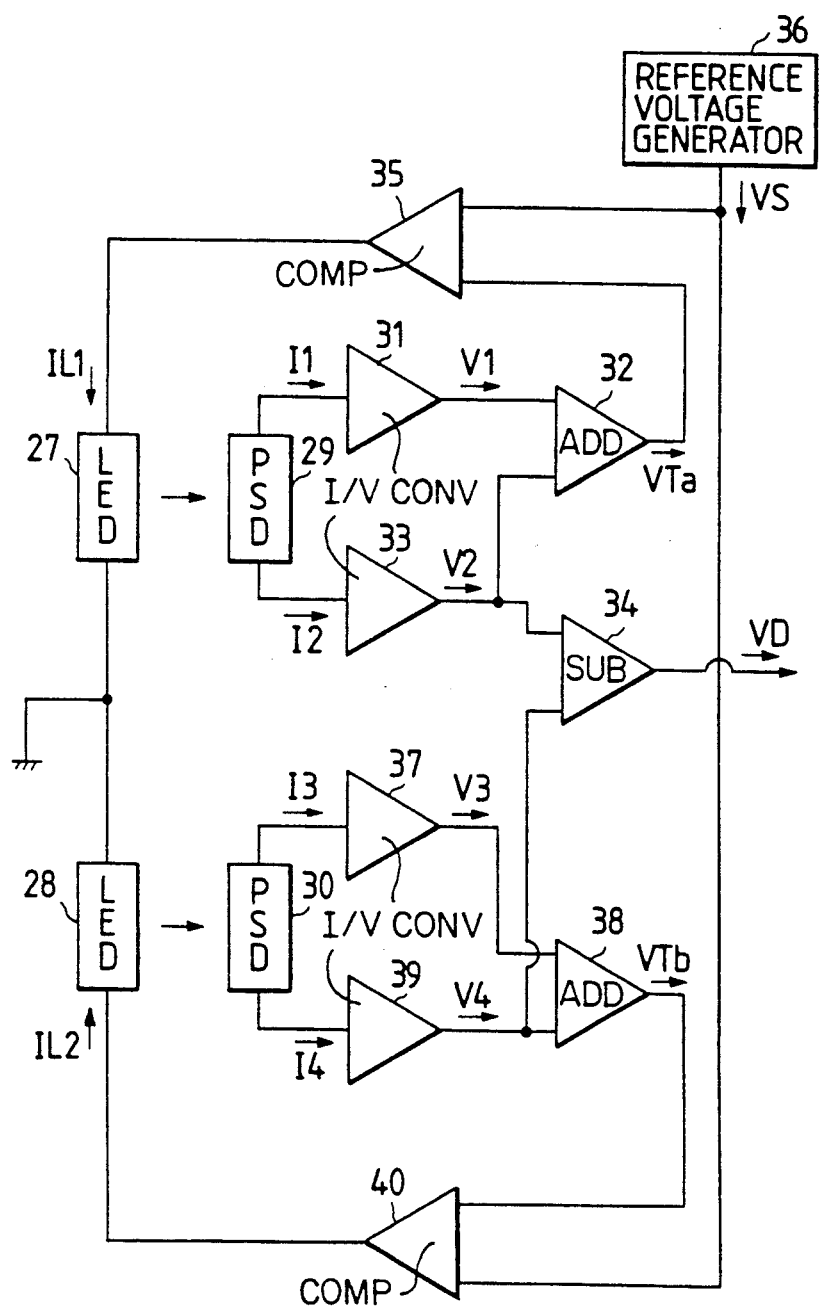
FIG. 12 is a block diagram showing the other electrical circuit in a fourth embodiment.

FIG. 12 is a block diagram showing an electrical circuit in the apparatus of the present invention. One of the output terminals of the detecting PSD 29 is connected through a current-to-voltage conversion circuit 31 to one of the input terminals of an adder 32. The other output terminal of the detecting PSD 29 is connected through another current-to-voltage conversion circuit 33 to the other input terminal of the adder 32 and to one of the input terminals of a subtracter 34.

The current-to-voltage conversion circuits 31 and 33 receives detection currents I1 and I2 from the detecting PSD 29, and convert them into voltage signals V1 and V2. The voltage signals V1 and V2 are applied to the adder 32, which outputs the sum of the voltages signal V1 and V2 as a voltage signal VTa (=V1 and V2).

The output terminal of the adder 32 is connected to one of the input terminals of a feedback circuit 35, the other input terminal of which is connected to the output terminal of a reference voltage generator 36, so that a reference voltage VS is applied to the feedback circuit 35. The output terminal of the feedback circuit 35 is grounded through the LED 27, so that drive current is applied to the LED 27. In this case, the feedback circuit 35 controls the drive current applied to the LED 27 so that the voltage signal VTa outputted by the adder 32 be equal to the reference voltage VS.

One of the output terminals of the reference PSD 30 is connected through a current-to-voltage conversion circuit 37 to one of the input terminals of an adder 38. The other output terminal of the reference PSD 30 is connected through another current-to-voltage conversion circuit 39 to the other input terminal of the adder 38 and to the other input terminal of the subtractor 34.

The current-to-voltage conversion circuits 37 and 39 receives detection currents I3 and I4 from the reference PSD 30, and convert them into voltage signals V3 and V4, respectively. The voltage signals V3 and V4 are applied to the adder 38, which outputs the sum of the voltages signals V3 and V4 as a voltage signal VTb (=V3+V4).

The output terminal of the adder 38 is connected to one of the input terminals of a feedback circuit 40, the other input terminal of which is connected to the output terminal of the reference voltage generator 36, so that the reference voltage VS is applied to the feedback circuit 40. The output terminal of the feedback circuit 40 is grounded through the LED 28, so that drive current is applied to the LED 28. In this case, the feedback circuit 40 controls the drive current applied to the LED 28 so that the voltage signal VTb outputted by the adder 32 be equal to the reference voltage VS.

In the subtracter 34, the voltage signal V4 outputted by the current-to-voltage conversion circuit 39 is subtracted from the voltage signal V2 outputted by the current-to-voltage conversion circuit 33. The result of subtraction is outputted as a detection voltage VD (=V2−V4).

Figure 13:
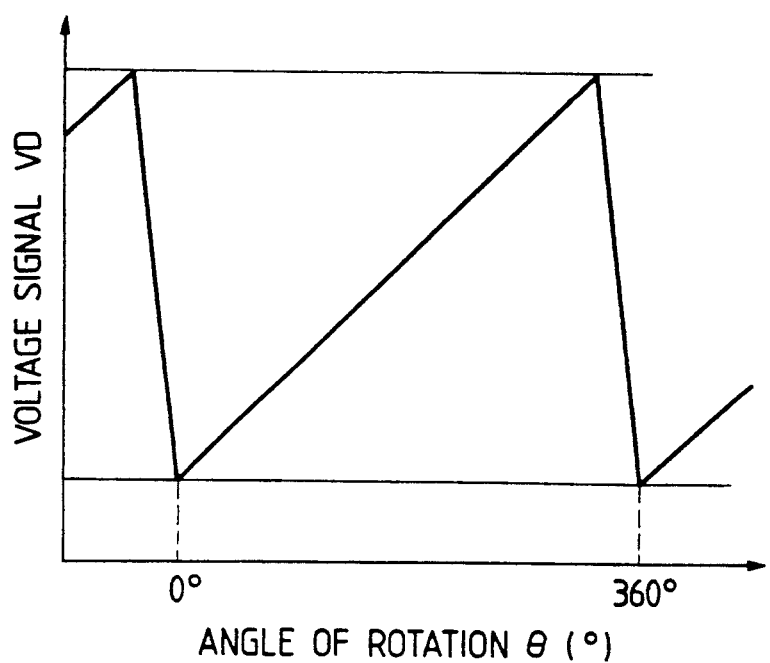
FIG. 13 is a graphical representation for a description of an output signal in the fourth embodiment.

The operation of the apparatus thus organized will be described with reference to FIG. 13.

As the object under test (not shown) rotates, the rotary shaft 21 and the rotary board 23 are rotated, and accordingly the detecting transparent slit 25 and the reference transparent slit 26 are also turned. As was described above, the reference transparent slit 26 is in the form of a circular ring having its center at the center of rotation 0 of the rotary board 23. Hence, while the rotary board is being rotated, theoretically the light beam applied through the reference transparent slit 26 to the reference PSD 30 is not changed in position on the light receiving surface of the latter 30 at all.

On the other hand, in the case of the detecting transparent slit 25 which is rotationally moved as the rotary board 23 rotates, its radial distance changes according to the above-described Equation (2). That is, the slit 25 is spiral. Hence, as the rotary board 23 turns increasing its angle of rotation θ, the light beam applied through the detecting transparent slit 25 to the detecting PSD 29 is changed in position on the light receiving surface of the latter 29.

When the light beam is applied from the LED 27 to the light receiving surface of the detecting PSD 29, its position d1 corresponding to the angle of rotation θ of the rotary board 23 is measured in a radial direction, and can be obtained from the above-described Equation (2):

$$d1 = A\theta + B \quad (8)$$

where A and B are the constants.

When the light beam is applied from the LED 28 to the light receiving surface of the reference PSD 30, its position d2 is maintained unchanged independently of the angle of rotation θ of the rotary board 23. Therefore, $$d2 = C \quad (9)$$

where C is the constant.

On the other hand, the detection currents I1 and I2 of the detecting PSD 29 are applied to the current-to-voltage conversion circuits 31 and 33, where they are converted into the voltage signals V1 and V2, respectively, which are applied to the adder 32. In the adder 32, the voltage signals V1 and V2 are subjected to addition, so that the sum of them is applied, as the voltage signal VTa, to the feedback circuit 35. When the voltage signal VTa is larger than the reference voltage VS, the feedback circuit 35 controls the drive current applied to the LED 27 so that the voltage signal VTa is decreased to the reference voltage VS; and when the voltage signal VTa is smaller than the reference voltage VS, the feedback circuit 35 controls the drive current so that the voltage signal Vta is increased to the reference voltage VS.

Thus, the sum (I1+I2) of the output currents I1 and I2 corresponding to the total quantity of light applied to the detecting PSD 29 from the LED 27 is controlled constant at all times.

Similarly, the detection currents I3 and I4 of the reference PSD 30 are applied to the current-to-voltage conversion circuits 37 and 39, where they are converted into the voltages signals V3 and V4, respectively, which are applied to the adder 38. In the adder 38, the voltages signals V3 and V4 are subjected to addition, so that the sum of them is applied, as the voltage signal VTb, to the feedback circuit 40. Thus, the feedback circuit 40 controls the drive current applied to the LED 28 so that the voltage signal VTb be constant with respect to the reference voltage VS.

As a result, the sum (I3+I4) of the output currents I3 and I4 corresponding to the total quantity of light applied from the LED 28 to the reference PSD 30 is so controlled that it is equal to (I1+I2), being constant at all times.

Thus, a value corresponding to the detection position d1 is obtained from the signal voltage V2 outputted by the current-to-voltage conversion circuit 33, while a value corresponding to the detection position d2 is obtained from the voltage signal V4 outputted by the current-to-voltage conversion circuit 39. The voltage signal VD (=V2−V4) outputted by the subtracter 34, in which the difference between those data is calculated, corresponds to the distance between the detection positions d1 and d2.

From Equations (8) and (9), $$d1 - d2 = A \times \theta + (B - C) \quad (10)$$
$$= A \times \theta + D$$

where D is the constant which is equal to (B−C). Therefore, the voltage signal VD outputted by the subtracter 34 is proportional to the angle of rotation $\theta$ of the rotary board 23. That is, the angle of rotation $\theta$ of the rotary board can be read by detecting the voltage signal VD.

Hence, the output voltage VD of the subtracter 34 correspond to the angle of rotation $\theta$ of the rotary board 23 as shown in FIG. 4. Thus, the angles of rotation $\theta$ of the rotary board 23 can be detected in a range of from 0° (the reference position) to about 360°.

In the case where the rotary board 23 is unstable in rotational position for instance because the rotary board is not coaxial with the rotary shaft, or the rotary shaft 21 is not satisfactorily supported by the bearings on the casing 22, the light reception signals V2 and V4 provided through the PSDs 29 and 30 become unstable, thus not meeting Equations (8) and (9).

However, even in the above-described case, the relative position of the detecting transparent slit 25 and the reference transparent slit 26 is not changed at all, and therefore the light reception signals V2 and V4 of the PSDs 29 and 30 are both increased or decreased as much as the amount of eccentricity of the rotary board, when outputted.

If it is assumed that the light reception signals V2 and V4 are each shifted as much as Δd (hereinafter referred to as "a shift component Δd", when applicable) because of the eccentricity of the rotary board 23 when the angle of rotation is $\theta$, then from Equations (8) and (9)

$$d1 = A \times \theta + B + \Delta d \quad (11)$$

$$d2 = C + \Delta d \quad (12)$$

When those Equations (11) and (12) are inserted into the above-described Equation (10), then a voltage signal VD' can be obtained which corresponds to the voltage signal VD outputted by the subtracter 34. In this operation, the shift components Δd in Equations (11) and (12) are canceled out; that is, the resultant value is the same as in the case where it is obtained directly from Equation (10).

That is, even when the light reception signals include the shift component Δd because of the eccentricity of the rotary board 23, the positional relation of the detecting transparent slit 25 and the reference transparent slit 26 is maintained unchanged, and therefore the shift components Δd of the light reception signals are canceled out when subjected to subtraction by the subtracter 34. Thus, the result of detection is the same as in the case where the rotary board is coaxial with the rotary shaft.

If summarized, in the above-described embodiment, the quantities of light applied from the LEDs 27 and 28 to the detecting PSD 29 and the reference PSD 30 are controlled as follows: That is, the feedback circuits 35 and 40 control the drive currents applied to the LEDs 27 and 28 so that the voltage signals VTa and VTb outputted by the adders 32 and 38 are constant at all times.

Hence, the current values corresponding to the total quantities of light outputted by the detecting PSD 29 and the reference PSD 30 are constant at all times, and are equal to each other. The voltage signals V2 and V4 can be directly used as proportional to the detection position.

Therefore, even when there is a play between the rotary shaft 21 and the rotary board 23, without the dividers high in manufacturing cost and intricate in adjustment the apparatus can be formed which is able to detect the angle of rotation of the rotary shaft 21 with high accuracy. Thus, the apparatus of the invention is low in manufacturing cost and simple in arrangement, requiring no adjustment.

Figure 14:
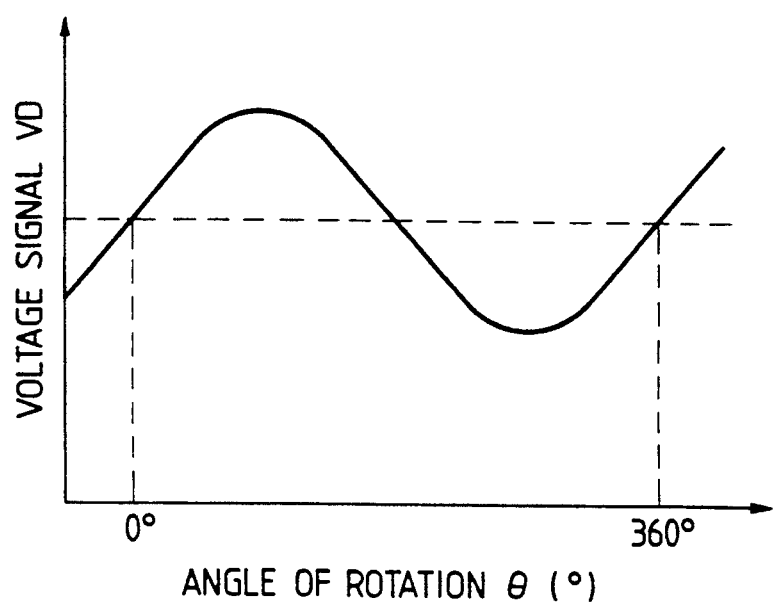
FIG. 14 is a graphical representation for a description of an output signal in a fifth embodiment.

A fifth embodiment of this invention, an angle-of-rotation detecting apparatus as shown in FIG. 5 to which the circuit as shown in FIG. 12 is applied, will be described with reference to FIGS. 5, and 14. For simplification in description, only parts different from those of the above-described the fourth embodiment will be described.

With the detecting transparent slit 124, the distance (r) between the center of rotation 0 of the rotary board 23 and the detecting transparent slit 124 changes with the angle of rotation $\theta$ of the rotary board as follows:

$$r = a \times \sin \theta + b \quad (13)$$

where a and b are the constants determined from the configuration of the detecting transparent slit 124.

Hence, the position of the light beam which, when the rotary board 23 turns, is received through the detecting transparent slit 124 by the detecting PSD 29 changes while satisfying the above-described Equation (13). In this case, the light reception signal V2 outputted by the detecting PSD 29 changes according to the following Equation (13) based on the above-described Equation:

$$d1 = A \times \sin \theta + B \quad (14)$$

where A and B are the constants.

On the other hand, the reference PSD 30 receives a light beam through the reference transparent slit 26 to provide the light reception signal V4. The light reception signal V4 is constant similarly as in the above-described first embodiment. Therefore, when the subtracter 34 performs the subtraction, the detection signal VD outputted by the subtracter 34 changes, like a sine wave, with the angle of rotation $\theta$ of the rotary board 23 as shown in FIG. 6. Hence, the angle of rotation $\theta$ of the rotary board 23 can be univocally determined, in a range of $\pm 90°$ (from 0° to 180°), from the detection signal VD.

As is apparent from the above description, the fifth embodiment has substantially the same effects as the fourth embodiment.

Furthermore, in the above-described embodiments, no optical means are employed. However, it goes without saying that the apparatuses may employ optical systems such as lenses when necessary.

In the position detecting apparatus of the fourth and fifth embodiments of the present invention, the pair of feedback circuits calculate the differences of the outputs of the pair of adders from the reference voltage, respectively, to control the drive currents applied to the light emitting units so that the quantities of light applied to the semiconductor position detecting elements from the light emitting units be constant. Thus, in the apparatus, it is unnecessary to use dividers, and the output signals of the semiconductor position detecting elements can be used directly as position detection signals. Hence, the apparatus is simple in construction, requiring no adjustment. Those effects should be highly appreciated.

Sixth to tenth embodiments of the present invention, as described hereinbelow provides certain advantages over the first embodiment, giving attention to the following characteristics of the first embodiment.

The first embodiment of the present invention is still disadvantageous in the following points: As shown in FIG. 4, in a region (a) where the angle of rotation is closed to 0° the output V112 changes in level abruptly because two ends 3a and 3b of the detecting transparent slit 25 are radially staggered from each other. The change of level in the region (a) is equal in range to that in the other region (b). Hence, it is impossible to detect all angles of rotation $\theta$ of the rotary board 23 only from the level of the output V112.

This difficulty may be eliminated by provision of another detecting element for the region. However, this will not only make intricate the construction of the apparatus as much, but also increase the manufacturing cost thereof.

In view of the foregoing, the sixth to tenth embodiments of this invention are to provide a angle-of-rotation detecting apparatus which is simple in construction and low in manufacturing cost, and yet is able to detect all angles of rotation $\theta$ of the rotary shaft up to 360° with high accuracy.

Figure 17:
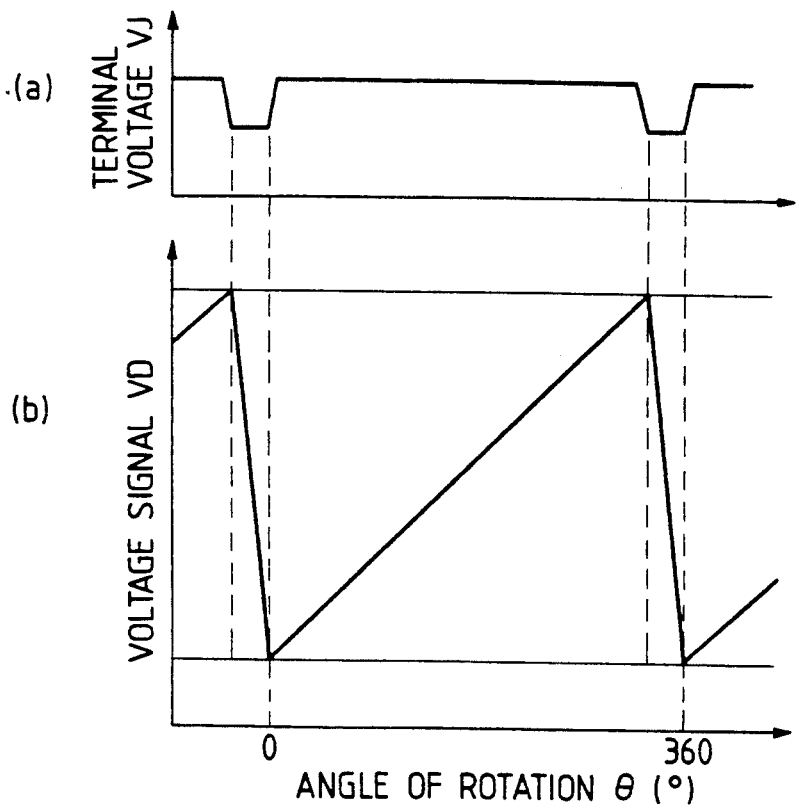
FIGS. 17 (a) and 17 (b) are graphical representation showing output signals in the electrical circuit of FIG. 16.

The sixth embodiment of this invention will be described with reference to FIGS. 15, 16 and 17. The sixth embodiment has substantially the same effects as the fifth embodiment of the present invention except when the angle of rotation $\theta$ of the rotary board is around 0°.

In the sixth embodiment, parts different from those in the FIGS. 1 and 12 will be described.

Figure 15:
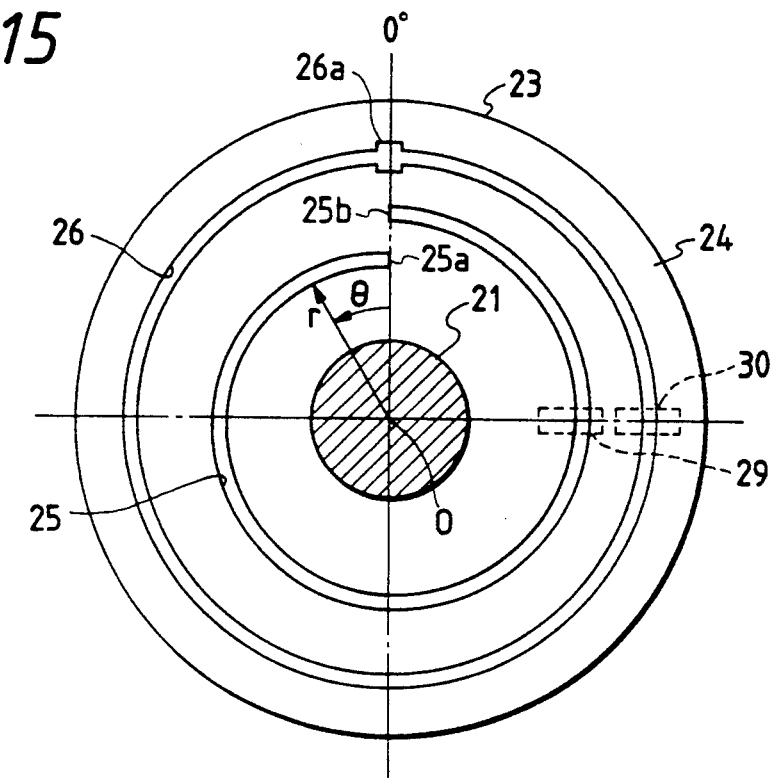
FIG. 15 is a plan view showing a rotary board in a sixth embodiment of the present invention.

As shown in FIG. 15, since the configuration of the detecting transparent slit 25 is determined to meet the above described equation (2), the detecting transparent slit 25 is not continuous at a reference position ($\theta = 0°$). More specifically, the detecting transparent slit 25 has both ends 25a and 25b in a particular region of the rotary board where the angle of rotation $\theta$ changes from a value close to 360° to 0°. The reference transparent slit 26 includes an identifying transparent slit 26a larger in width which is radially in alignment with the two ends 25a and 25b of the detecting transparent slit 25.

Figure 16:
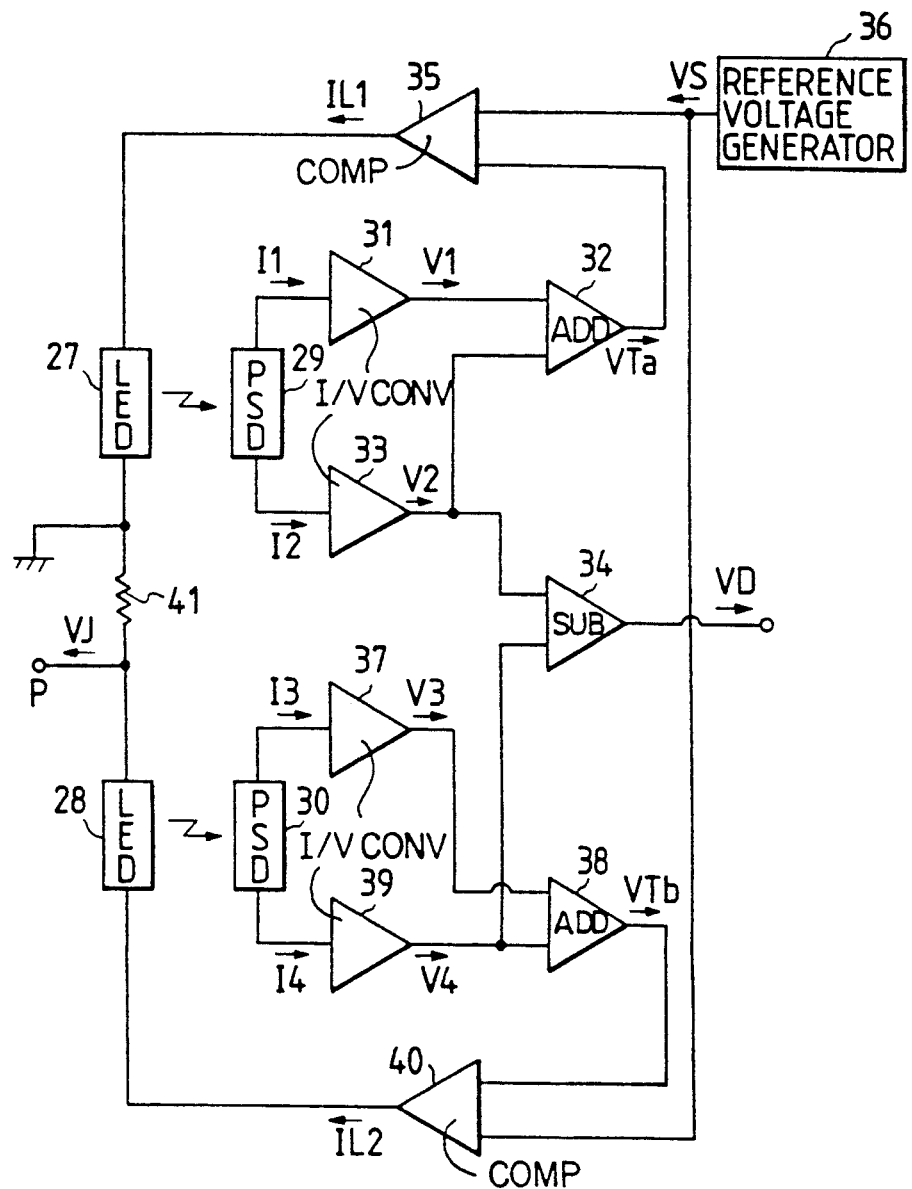
FIG. 16 is a block diagram showing an electrical circuit in the sixth embodiment.

As shown in FIG. 16, the connecting point of the LED 28 and the current detecting resistor 41 is employed as a rotation region identifying terminal P, at which the terminal voltage VJ of the current detecting resistor 41 is provided according to the current IL2 flowing in the current detecting resistor 41.

Therefore, in the case of the detecting transparent slit 25 which is rotationally moved as the rotary board 23 rotates, its radial distance changes according to the above-described Equation (2). That is, the slit 25 is spiral. Hence, as the rotary board 23 turns, the light beam applied through the detecting transparent slit 25 to the detecting PSD 29 is continuously changed in position on the light receiving surface of the latter 29 except when the angle of rotation $\theta$ of the rotary board is around 0°.

That is, as the angle of rotation $\theta$ of the rotary board 23 approaches 0°, the two ends 25a and 25b of the detecting transparent slit 25 come to the LED, so that the change in position of the light beam on the detecting PSD 29 is not continuous. In order to eliminate this difficulty, in the embodiment, the identifying transparent slit 26a is added to the reference transparent slit 26. Thus, the angles of rotation $\theta$ of the rotary board can be detected as shown in fourth embodiment except it is close to 0° (the reference position).

In the case where the angle of rotation $\theta$ of the rotary board 23 is close to 0° corresponding to the reference position, it is detected as follows: In this case, the position of the light beam applied from the LED 27, as a light spot, to the detecting PSD 29 is shifted abruptly on the light receiving surface of the latter 29; that is, the light beam is abruptly moved between the two ends 25a and 25b of the detecting transparent slit 25.

In this case, since the output light beam of a light emitting diode is generally somewhat divergent, the light beam from the LED 27 passes through both the ends 25a and 25b of the detecting transparent slit 25 simultaneously, and the quantity of light applied through the one end 25a of the detecting transparent slit 25 to the detecting PSD 29 and the quantity of light applied through the other end 25b to the detecting PSD 29 are gradually changed as the rotary board 23 turns. Hence, in this operation, as shown in FIG. 4, the voltage signal VD which the subtracter 34 provides according to the light reception signal outputted by the detecting PSD 29 changes linearly although it is steep.

This change of the voltage signal VD is the same as in the region of the rotary board except the particular region where the angle of rotation $\theta$ is close to 0° as illustrated in FIG. 17(b). Therefore, the angle of rotation $\theta$ cannot be determined from only the voltage signal VD. This rotation region close to 0° is identified for the rotary board by using the terminal voltage VJ provided at the rotation region identifying terminal P as follows:

As was described above, the detection currents I3 and I4 of the reference PSD 30 are so controlled by the feedback circuit 40 so that the sum of them (I3+I4) is constant at all times. On the other hand, when the angle of rotation $\theta$ of the rotary board 23 is closed to 0°, the identifying transparent slit 26a of the reference transparent slit 26 approaches the reference PSD 30. In this case, since the identifying transparent slit 26a is larger in width, the quantity of light from the LED 28 is increased.

As a result, the sum of the detection currents (I3+I4) of the reference PSD is increased, and therefore the feedback circuit 40 operates to decrease the drive current IL2 applied to the LED 28 so that the quantity of light received by the reference PSD 30 corresponds to the reference voltage VS. When the drive current IL2 applied to the LED 28 is decreased in this manner, the terminal voltage of the current detecting resistor 41 is decreased, as a result of which, as shown in the part (a) of FIG. 4, the terminal voltage VJ at the rotation region identifying terminal P is lowered in level in the region where the angle of rotation $\theta$ is close to 0° as illustrated in FIG. 17(a). Hence, it can be determined that, when the terminal voltage VJ at the rotation region identifying terminal P is lowered in level, then the angle of rotation $\theta$ of the rotary board 23 is in the region near 0°. This make it possible to detect the angle of rotation $\theta$ of the rotary board 23 from the voltage VD.

As was described above, in the sixth embodiment of the present invention, the reference transparent slit 26 includes the identifying transparent slit 26a larger in width which is radially in alignment with the discontinuous points of the detecting transparent slit 25, namely, the two ends 25a and 25b of the latter 25. The change of the quantity of light received by the reference PSD 30 due to the identifying transparent slit 25a is detected with the current detecting resistor 4. Hence, the angle of rotation $\theta$ close to 0°, which cannot be correctly detected from the voltage signal VD provided by the subtracter 34, can be positively detected with the apparatus of the invention which is simple in construction, using no particular detectors therefor.

Furthermore, in the above-described embodiment, the feedback circuits 35 and 40 are provided which control the drive currents applied to the LEDs 27 and 28 according to the voltage signals VTa and VTb provided with the aid of the adders 32 and 38, respectively, so that the quantities of light received by the detecting PSD 29 and the reference PSD 30 are maintained constant and equal at all times. Therefore, the voltages signals V2 and V4 outputted by the detecting PSD 29 and the reference PSD 30 can be used as values proportional to the detection positions as they are. Therefore, even in the case where there is a play between the rotary shaft 21 and the rotary board, it is unnecessary for the apparatus to employ dividers which is intricate in circuitry and high in manufacturing cost, and yet the apparatus can detect the angle of rotation $\theta$ of the rotary shaft 21 with high accuracy. Thus, the apparatus of the invention is low in manufacturing cost, and simple in construction, requirement no adjustment.

Figure 18:
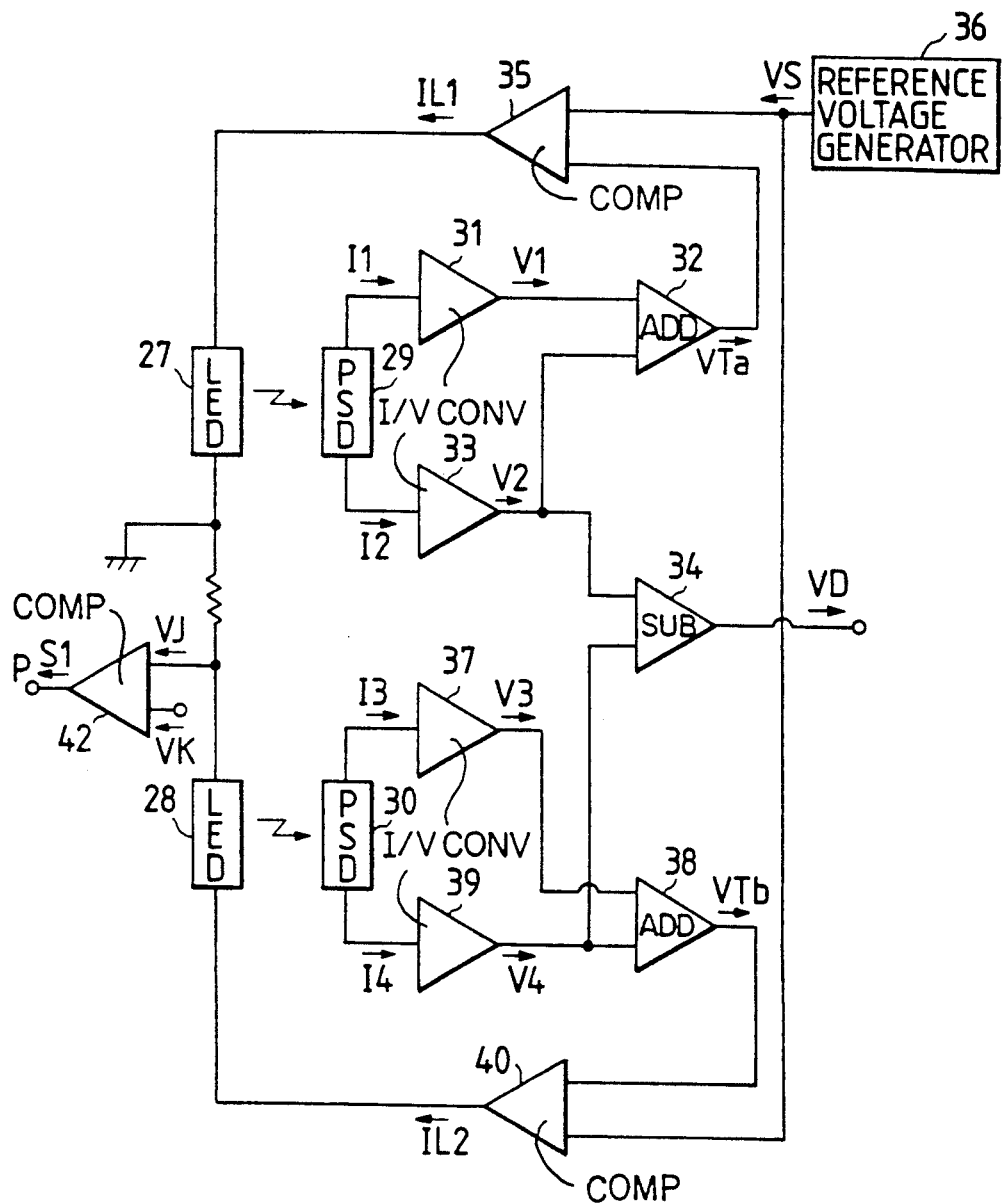
FIG. 18 is a block diagram showing an electrical circuit in a seventh embodiment.
Figure 19:
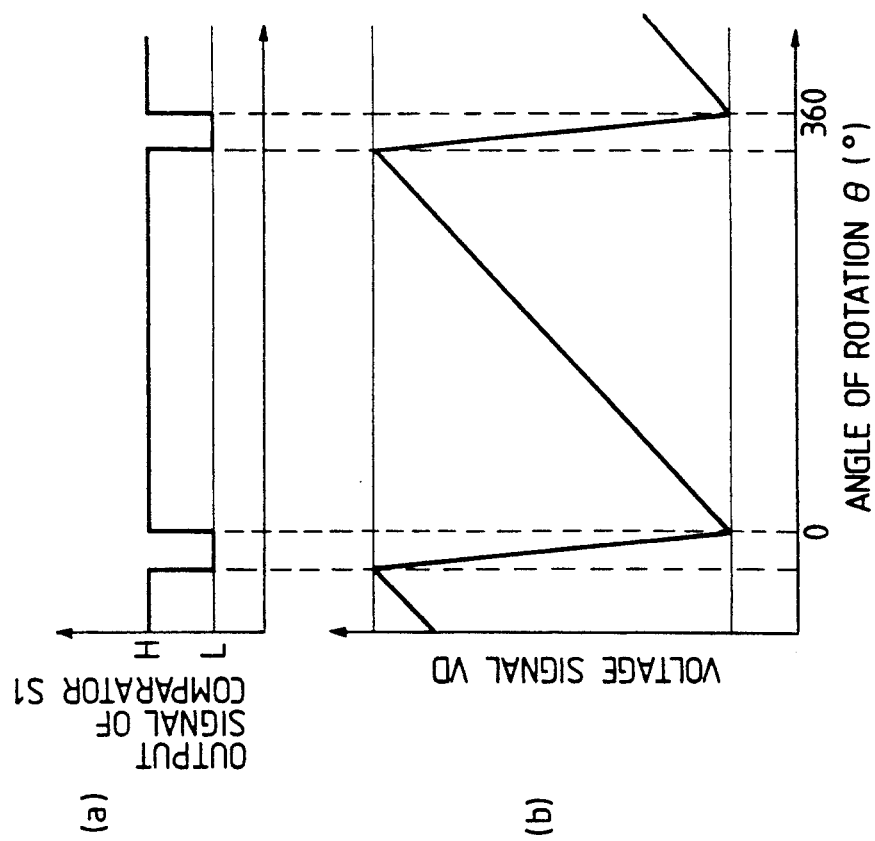
FIGS. 19 (a) and 19 (b) are graphical representation showing output signals in the electoral circuit of FIG. 18.

FIGS. 18 and 19 show a seventh embodiment of the angle-of-rotation detecting apparatus of the invention.

In the seventh embodiment, parts different from those in the sixth embodiment will be described. That is, in FIG. 18, the connecting point of the current detecting resistor 41 and the LED 28 is connected through a comparator 42 to the rotation region identifying terminal P. A reference voltage VK is applied to the reference input terminal of the comparator 42.

In the seventh embodiment, the terminal voltage of the current detecting resistor 41 is provided at the rotation region identifying terminal P; whereas, in the sixth embodiment, the comparator 42 provides a digital signal S1 to identify the rotation region of the rotary board 23 as illustrated FIG. 19(a). Thus, the seventh embodiment has the same effects as the sixth embodiment. Particularly, FIG. 19(b) shows the change in voltage signal VD of the seventh embodiment, which is similar to that shown in FIG. 17(b) of the sixth embodiment. With the six embodiment, the rotation region identifying operation can be carried out in a digital mode.

Figure 21:
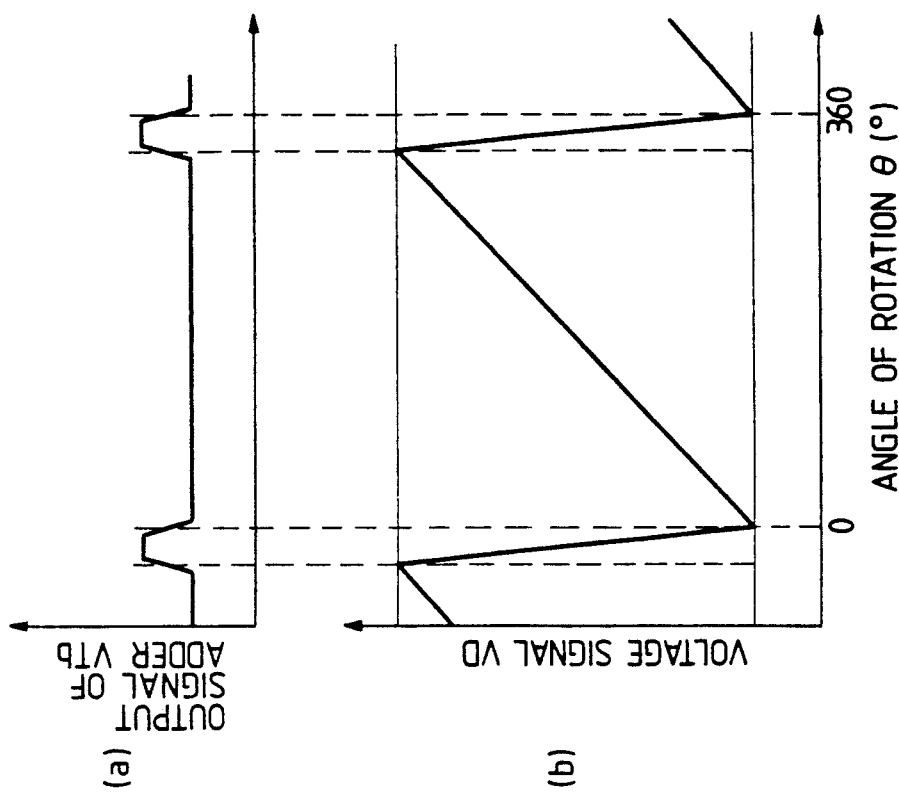
FIGS. 21 (a) and 21 (b) are graphical representation showing output signals in the electoral circuit of FIG. 20.
Figure 20:
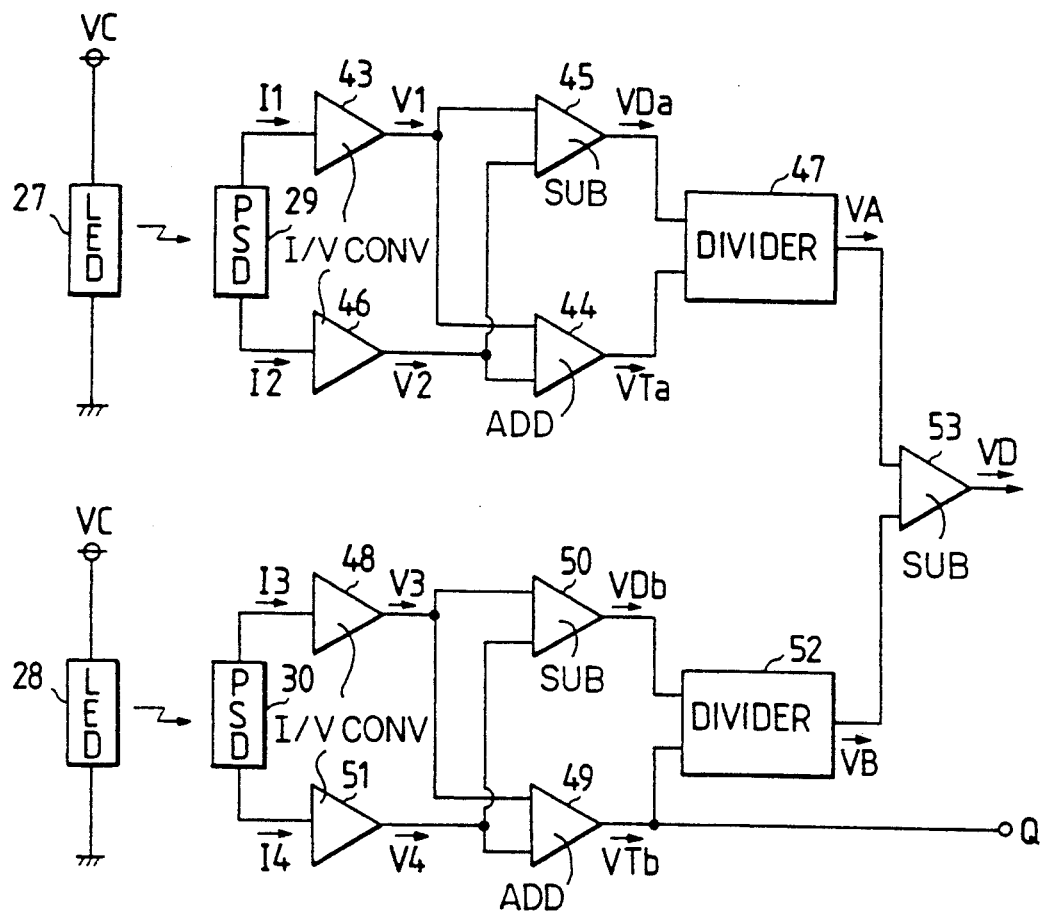
FIG. 20 is a block diagram showing an electrical circuit in an eighth embodiment.

FIGS. 20 and 21 show another an eighth embodiment according to the invention, which constitutes the sixth embodiment of the invention.

In the eighth embodiment, parts different from those in the six embodiment will be described. FIG. 20 is a block diagram showing an electrical circuit in the eighth embodiment. A predetermined DC source VC supplies a constant current to LEDs 27 and 28, so that the latter emits light beams constant in intensity. One of the output currents of a detecting PSD 29, namely, an output current I1 is applied to a current-to-voltage conversion circuit 43, where it is converted into a voltage signal V1. The voltage signal V1 is applied to one of the input terminals of an adder 44 and to one of the input terminals of a subtracter 45. The other output current I2 of the detecting PSD 29 is applied to another current-to-voltage conversion circuit 46, where it is converted into a voltage signal V2. The voltage signal V2 is applied to the other input terminal of the adder 44 and to the other input terminal of the subtracter 45.

As a result, the subtracter 45 outputs a voltage signal VDa ($=V1-V2$) corresponding to the difference (I1-−I2) between the detection currents, while the adder 44 outputs a voltage signal VTa ($=V1+V2$) corresponding to the sum (I1+I2) of the detection currents; that is, a total quantity of light received by the PSD 29. Those voltage signals VDa and VTa are applied to a divider 47, where the former VDa is divided by the latter VTa. The result of division is outputted as a voltage signal VA.

On the other hand, one of the output currents of a detecting PSD 30, namely, an output current I3 is applied to a current-to-voltage conversion circuit 48, where it is converted into a voltage signal V3. The voltage signal V3 is applied to one of the input terminals of an adder 49 and to one of the input terminals of a subtracter 50. The other output current I4 of the detecting PSD 28 is applied to another current-to-voltage conversion circuit 51, where it is converted into a voltage signal V4. The voltage signal V4 is applied to the other input terminal of the adder 49 and to the other input terminal of the subtracter 50. The output terminal of the adder 49 is connected to a rotation region detecting terminal Q.

As a result, the subtracter 50 outputs a voltage signal VDb ($=V3-V4$) corresponding to the difference (I3-−I4) between the detection currents, while the adder 49 outputs a voltage signal VTb ($=V3+V4$) corresponding to the sum (I3+I4) of the detection currents; that is, a total quantity of light received by the PSD 30. Those voltage signals VDb and VTb are applied to another divider 52, where the former VDb is divided by the latter VTa. The result of division is outputted as a voltage signal VB.

The voltages signals VA and VB of the dividers 47 and 52 are applied to a subtracter 53, where the voltage signal VB is subtracted from the voltage signal VA. As a result, a voltage signal VD ($=VA-VB$) is provided which corresponds to the angle of rotation $\theta$.

Similarly as in the sixth embodiment, the position of the detecting transparent slit 25 and the position of the reference transparent slit 26, which correspond to the angle of rotation $\theta$ of the rotary board 23, are detected by the detecting PSD 29 and the reference PSD 30, and the voltage signal VD corresponding to the angle of rotation θ of the rotary board 23 is outputted by the subtracter 53 as illustrated in FIG. 21(b) (cf. FIG. 8). When the angle of rotation θ of the rotary board 23 is close to 0°, the output light beam of the LED 28 is applied to the reference PSD 30 through the identifying transparent slit 26a forming the reference transparent slit 26, so that the total quantity of light received by the reference PSD 30 is increased, and the voltage signal VTb outputted by the adder 49 is increased accordingly as illustrated in FIG. 21(a). Hence, by detecting the voltage signal VTb at the rotation region detecting terminal Q, the rotation region of the rotary board can be identified.

Figure 22:
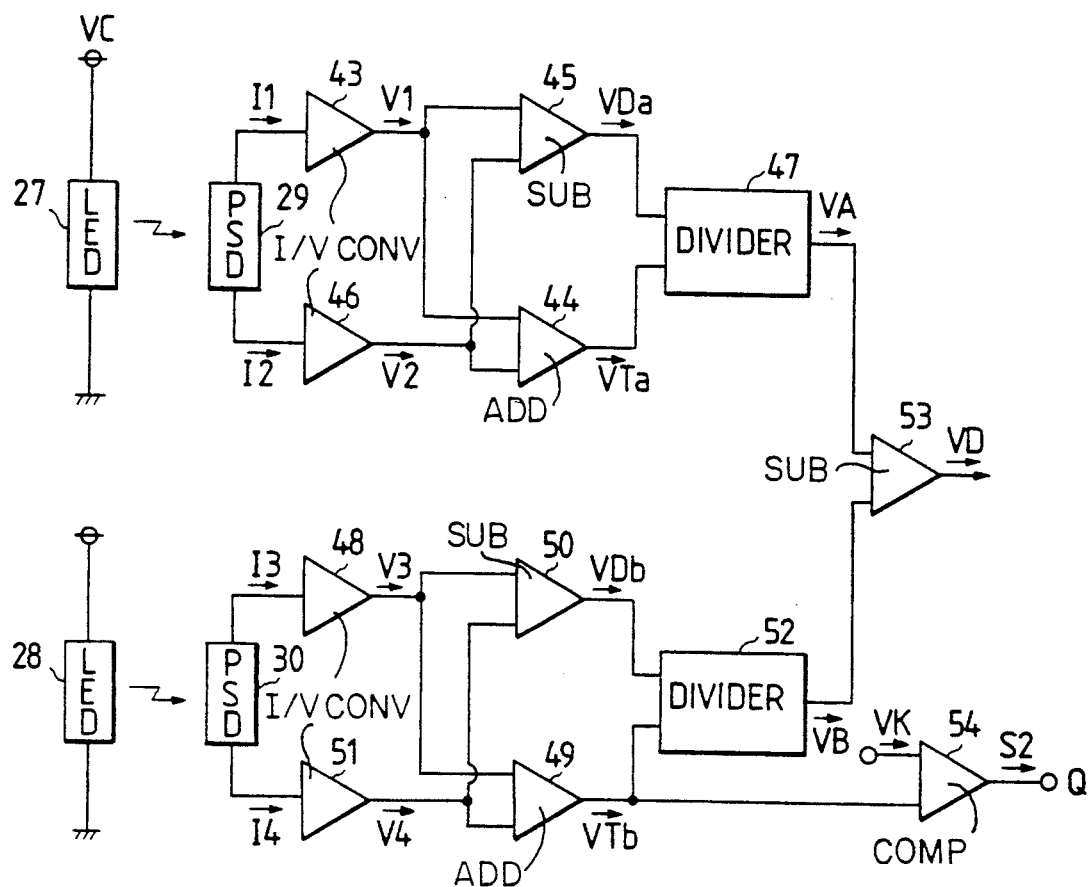
FIG. 22 is a block diagram showing an electrical circuit in a ninth embodiment.
Figure 23:
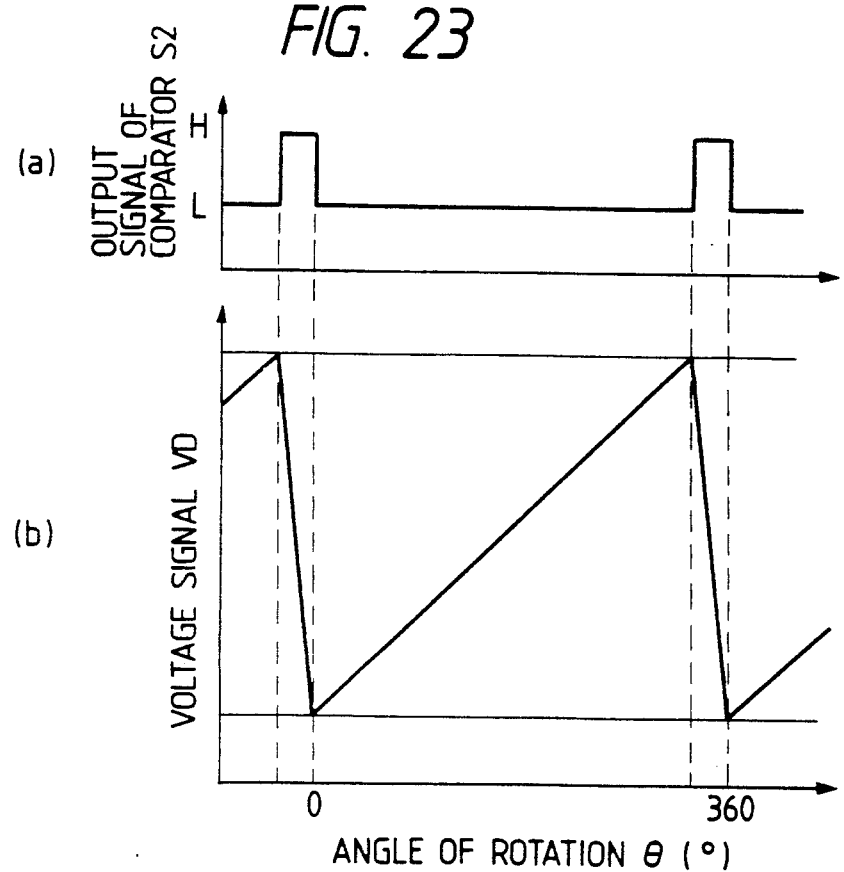
FIGS. 23 (a) and 23 (b) are graphical representation showing output signals in the electoral circuit of FIG. 22.

FIGS. 22 and 23 shows a ninth embodiment of the invention. In the ninth embodiment, parts different from those in the eighth embodiment will be described. As shown in FIG. 22, the output terminal of the adder 49 is connected through a comparator 54 to the rotation region detecting terminal Q. A reference voltage VK is applied to the reference input terminal of the comparator 54. As was described above, in the eighth embodiment, the voltage signal VTb is applied to the rotation region identifying terminal Q by the adder 49 in the third embodiment; whereas, in the ninth embodiment, the comparator 54 outputs a digital signal S2 corresponding to the variations in level of the voltage signal VTb as shown in FIG. 23, to identify the rotation region of the rotary board 23. Thus, the ninth embodiment has the same effects as the eighth embodiment, and can identify the rotation region of the rotary board in a digital mode.

Figure 24:
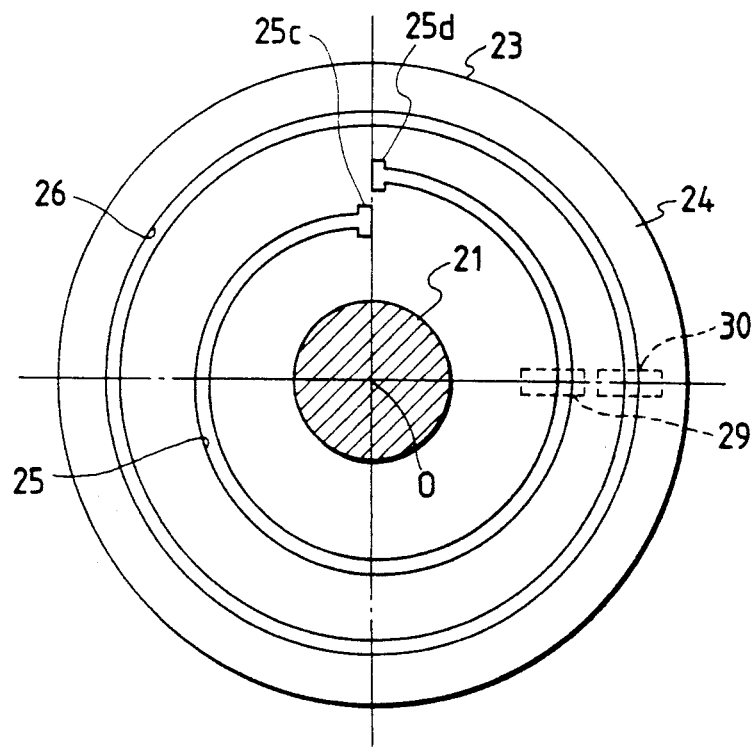
FIG. 24 is a plan view showing a rotary board in a tenth embodiment of the invention.

FIG. 24 shows a tenth embodiment. In the tenth embodiment, parts different from those in the sixth embodiment will be described. In the sixth embodiment, the reference transparent slit 26 includes the identifying transparent slit 26; whereas, in the tenth embodiment, as shown in FIG. 24 the detecting transparent slit 25 has two identifying transparent slits 25c and 25d at both ends which are larger in width than the remaining. Similarly as in the above-described the sixth embodiment, when the angle of rotation θ is closed to 0° corresponding to the positions of both ends of the detecting transparent slit 25, the quantity of light received by the detecting PSD 29 is increased, and therefore control is so made as to decrease the quantity of light emitted by the LED 27 thereby to decrease the quantity of light received by the detecting PSD 29. Hence, the rotation region of the rotary board 23 can be detected from the variation of the drive current of the LED 27. Thus, the tenth embodiment has the same effects as the sixth through ninth embodiments.

In the above-described embodiments, the identifying transparent slit forming the reference transparent slit or the detecting transparent slit is larger in width; however, the invention is not limited thereto or thereby. That is, the same effects may be obtained by making the identifying transparent slit smaller in width.

In each of the above-described embodiments, two light emitting diodes 27 and 28 are provided for the detecting PSD 29 and the reference PSD 30, respectively; however, the invention is not limited thereto or thereby. That is, only one light emitting diode may be provided so as to activate the two PSDs 29 and 30.

Furthermore, each of the above-described embodiments has no optical system between the light emitting element and the light receiving element. However, it goes without saying that an optical system such as a lens may be provided therebetween as the case may be.

In the position apparatus of the invention, the reference transparent slit or the detecting transparent slit formed in the rotary board includes the identifying transparent sit different in width in the particular region of the rotary board where two ends of the detecting transparent slit are radially staggered from each other. Therefore, when the particular region comes to the semiconductor position detecting element as the rotary boards turns, the total quantity of light passing through the identifying transparent slit changes with respect to the quantity of light passing through the remaining slit, from which it can be detected that the angle of rotation θ of the rotary board is closed to 0°. Thus, the apparatus of the invention is simple in construction and low in manufacturing cost, and yet it can detects all angles of rotation of the rotary shaft with high accuracy.

In each of the above-described embodiments, the technical concept of the invention is applied to the angle-of-rotation detecting apparatus; however, the invention is not limited thereto or thereby. That is, for instance, the technical concept of the invention may be applied to a position detecting apparatus for detecting the position of an object under test which moves straightly. An embodiment having the technical concept of the invention applied to a linear movement position detecting apparatus is as follows.

Figure 25:
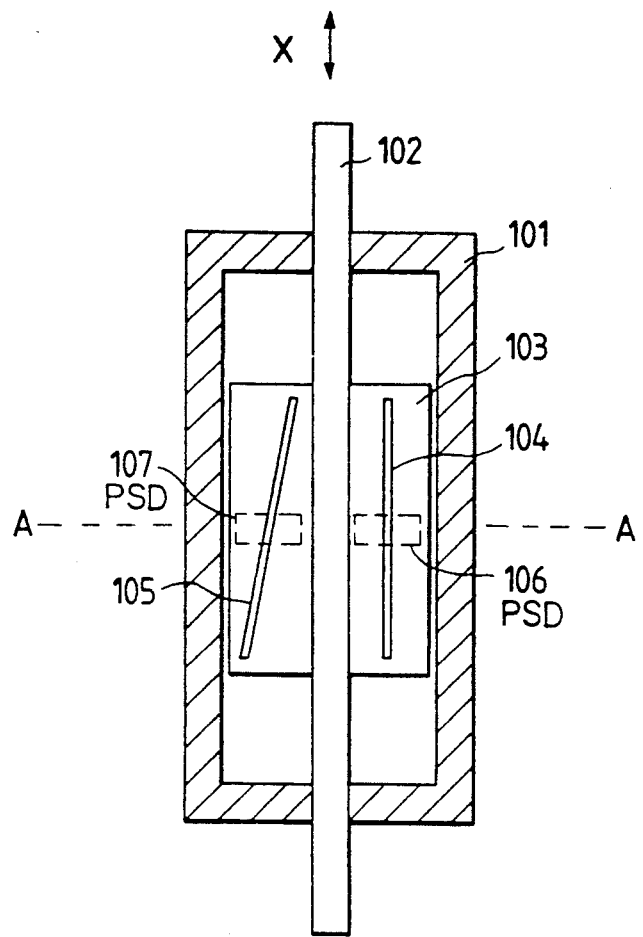
FIG. 25 is a plan view showing an eleventh embodiment of the position detetecing apparatus according to the present invention.
Figure 26:
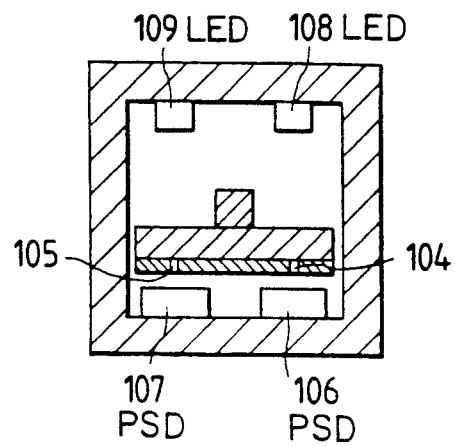
FIG. 26 is a transversal sectional view in FIG. 25 taken along a line A—A.

Eleventh embodiment of the invention will be described with the reference to FIGS. 25 and 26. A reference numeral 101 designates a case supporting a rod 102 to slidably move in the linear direction depicted at a double headed arrow X shown in FIG. 25. A reference numeral 103 designates a slit plate secured on the rod 102. The slit plate 103 contains a reference transparent slit 104 extending in the same direction of the movement of the rod and a detecting transparent slit 105 which is slightly inclined with respect to the movement direction of the rod 102. A reference numeral 106 designates a PSD which is confronted with a LED 108 through the reference transparent slit 104 of the slit plate 103. The PSD 106 detects the position of light, which is generated from the LED 108, transmitted to the reference transparent slit 104. The light detection direction of the PSD 106 is orthogonal to the movement direction of the rod 102. A reference numeral 107 designates a PSD. The PSD 107 is confronted with a LED 109 through the detecting transparent slit 105 of the slit plate 103. The PSD 107 receives the position of the light, which is generated from the LED 109, transmitted to the detecting transparent slit 105. The light detection direction is orthogonal to the movement direction of the rod 102.

This embodiment has substantially the same effect of another embodiments of the present invention. Namely, when the rod moves, the PSD 107 detects the variation of the light position transmitted to the detecting transparent slit 105. On the other hand, the light position transmitted to the reference transparent slit 104 (this light position is not changed in view of the principle) is detected by the PSD 106. The difference between signals in response to the light positions detected by the PSD 106 and 107 corresponds to the position of the rod 102. In this case, when a play exists between the case 101 and the rod 102, the error does not become large and the measurement is obtained in high accuracy, because the difference between signals generated by the PSDs 106 and 107 is detected, namely, the distance between the reference and the detecting transparent slits 104 and 105 is detected.

Additionally, in this embodiment, the reference transparent slit 104 is parallel to the movement direction of rod 102. Of course, it is capable of having the structure that reference transparent slit 104 is slightly inclined as the detecting transparent slit 105 as shown in FIG. 24.

Although the present invention has been described in terms of the presently preferred embodiments, it is to be understand that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An angle of rotation detecting apparatus comprising:
   a rotary board mounted on a rotary shaft, said rotary board having a center of rotation and a ring shaped reference transparent slit having a predetermined radius, and a detecting transparent slit extended in a direction of rotation of said rotary board in such a manner that a distance between said detecting transparent slit and the center of rotation of said rotary board changes continuously;
   stationary light emitting means for projecting light through said reference transparent slit and said detecting transparent slit;
   stationary light receiving means for receiving said light projected through said reference transparent slit and projected through said detecting transparent slit to detect light receiving positions in a direction along a radius of said rotary board and to output light reception signals in accordance with said reference transparent slit and said detecting transparent slit, respectively; and
   arithmetic means for calculating an angle of rotation of said rotary board in accordance with said light reception signals outputted by said light receiving means.

2. An angle of rotation detecting apparatus as claimed in claim 1, wherein said detecting transparent slit is spiral shaped.

3. An angle of rotation detecting apparatus as claimed in claim 1, wherein said detecting transparent slit is ring-shaped with a center slightly shifted from the center of rotation of said rotary board.

4. An angle of rotation detecting apparatus as claimed in claim 2, wherein one of said detecting transparent slit and said reference transparent slit of said rotary board includes an identifying transparent slit, and said identifying transparent slit is radially in alignment with ends of said detecting transparent slit.

5. An angle of rotation detecting apparatus as claimed in claim 1, wherein said light receiving means includes first and second position detecting elements.

6. An angle of rotation detecting apparatus as claimed in claim 5, said arithmetic means includes:
   first and second adders for respectively summing two light reception signals generated by respectively said first and second position detecting elements, said first adder for summing two output signals of said first position detecting element and said second adder for summing two output signals of said second position detecting element;
   a subtracter for subtracting one of said two outputs of said first position detecting element and one of said two outputs of said second position detecting element; and
   first and second feed back circuits for calculating a difference between an output of said first adder and a reference voltage and a difference between an output of said second adder and said reference voltage, respectively, to control a quantity of light of said light emitting means received by the first and second position detecting elements, respectively, and an output of said subtracter being utilized to detect a position of said rotary board.

7. An angle of rotation detecting apparatus as claimed in claim 5, said arithmetic means includes:
   first and second adders for respectively summing two light reception signals generated by respectively said first and second position detecting elements, said first adder for summing two output signals of said first position detecting element and said second adder for summing two output signals of said second position detecting element;
   first and second subtracters for respectively subtracting said two light reception signals generated by respectively said first and second position detecting elements, said first subtracter for subtracting said two outputs of said first position detecting element and said second subtracter for subtracting said two outputs of said second position detecting element;
   first and second dividers for respectively dividing output signals of said first and second subtracters by output signals of said first and second adders, respectively, said first divider for dividing said output signal of said first subtracter by said output signal of said first adder, said second divider for dividing said output signal of said second subtracter by said output signal of said second adder; and
   a third subtracter for subtracting output signals of said first and second dividers to generate a voltage signal corresponding to a rotation angle of said rotary board.

8. An angle of rotation detecting apparatus as claimed in claim 7, wherein one of said first and second adders includes a rotation region detecting terminal.

9. A position detecting apparatus comprising:
   first and second position detecting elements for receiving light beams outputted by first and second light emitting units, respectively;
   first adder for summing said two output signals of said first position detecting element;
   second adder for summing said two output signals of said second position detecting element;
   a subtracter for subtracting one of the two outputs of said first position detecting element and one of said two outputs of said second position detecting element to detect a position of an object;
   first feedback circuit for calculating the difference between an output of said first adder and a reference voltage to maintain constant a quantity of said light beam received by said first position detecting element; and
   second feedback circuit for calculating the difference between an output of said second adder and said reference voltage to maintain constant a quantity of said light beam received by said second position detecting element.

10. A position detecting apparatus comprising:

a rod mounted for movement in a linear direction;

a slit plate secured to said rod, said slit plate having a reference transparent slit extending in a direction substantially parallel to the linear direction of a movement of said rod and a detecting transparent slit formed in such a manner that a distance between said reference transparent slit and said detecting transparent slit changes continuously;

stationary light emitting means for applying light beam to said reference transparent slit and said detecting transparent slit;

stationary light receiving means for receiving said light beam passed through said reference transparent slit and passed through said detecting transparent slit to detect light receiving positions of said rod and to output light reception signals in accordance with said light reception positions of said reference transparent slit and said detecting transparent slit, respectively; and arithmetic means for calculating a position of said rod in accordance with said light reception signals.

11. A position detection apparatus as claimed in claim 10, wherein said light receiving means includes first and second light emitting units and said light receiving means includes first and second light position detecting elements.

12. A position detecting apparatus as claimed in claim 11 said arithmetic means includes;

first adder for summing two output signals of said first position detecting element;

second adder for summing two output signals of said first position detecting element;

a subtracter for subtracting one of said two outputs of said first position detecting element and one of said two outputs of said second position detecting element to detect a position of an object;

first feedback circuit for calculating the difference between an output of said first adder and a reference voltage to maintain constant a quantity of said light beam applied to said first position detecting element; and second feedback circuit for calculating the difference between an output of said second adder and said reference voltage to maintain constant a quantity of said light beam applied to said second position detecting element.

* * * * *

UNITED STATES PATENT AND TRADEMARK OFFICE
CERTIFICATE OF CORRECTION

PATENT NO. : 5,272,335
DATED : December 21, 1993
INVENTOR(S) : Junichi Nakaho

It is certified that error appears in the above-indentified patent and that said Letters Patent is hereby corrected as shown below:

Claim 6, column 26, line 5, change "feed back" to --feedback--.

Claim 12, column 28, line 4, change "includes;" to --includes:--.

Signed and Sealed this

Twenty-seventh Day of September, 1994

Attest:

BRUCE LEHMAN

*Attesting Officer*          *Commissioner of Patents and Trademarks*